(12) United States Patent
Nordlund

(10) Patent No.: US 7,969,289 B2
(45) Date of Patent: Jun. 28, 2011

(54) METHOD, COMPUTER PROGRAM AND DEVICE FOR DETERMINING THE RISK OF MIDAIR COLLISION

(75) Inventor: Per-Johan Nordlund, Linköping (SE)

(73) Assignee: SAAB AB, Linköping (SE)

( * ) Notice: Subject to any disclaimer, the term of this patent is extended or adjusted under 35 U.S.C. 154(b) by 325 days.

(21) Appl. No.: 12/210,806

(22) Filed: Sep. 15, 2008

(65) Prior Publication Data

US 2009/0102630 A1 Apr. 23, 2009

(30) Foreign Application Priority Data

Sep. 14, 2007 (EP) .................................... 07116447

(51) Int. Cl.
*B60Q 1/00* (2006.01)
(52) U.S. Cl. ...................... 340/436; 340/425.5; 340/901
(58) Field of Classification Search .................. 340/436, 340/425.5, 901–903, 435, 904; 701/300, 701/301, 93, 96, 45
See application file for complete search history.

(56) References Cited

U.S. PATENT DOCUMENTS

| | | | |
|---|---|---|---|
| 5,410,346 A | | 4/1995 | Saneyoshi et al. |
| 5,572,428 A | * | 11/1996 | Ishida et al. ................. 701/301 |
| 6,327,536 B1 | | 12/2001 | Tsuji et al. |
| 6,694,283 B2 | * | 2/2004 | Alfano et al. ................. 702/150 |
| 6,820,006 B2 | * | 11/2004 | Patera ............................ 701/301 |
| 6,859,731 B2 | * | 2/2005 | Takafuji et al. ................ 701/301 |
| 7,167,799 B1 | * | 1/2007 | Dolgov et al. ................. 701/301 |
| 2002/0183929 A1 | * | 12/2002 | Tsuji et al. ..................... 701/301 |
| 2007/0210953 A1 | | 9/2007 | Abraham et al. |

FOREIGN PATENT DOCUMENTS

| | | |
|---|---|---|
| EP | 0459295 A | 12/1991 |
| EP | 0874331 A2 | 10/1998 |
| GB | 2285719 A | 7/1995 |

OTHER PUBLICATIONS

European Search Report—Feb. 20, 2008.

* cited by examiner

*Primary Examiner* — Daniel Previl
(74) *Attorney, Agent, or Firm* — Venable LLP; Eric J. Franklin

(57) ABSTRACT

A method for determining the probability of a vehicle colliding with a detected object. The object is detected. A stochastic process is determined representing a relative distance between the vehicle and the detected object. The stochastic process has a direction and a velocity relative the vehicle. A safety zone of the vehicle is defined in relation to the detected object as a straight line perpendicular to a line of sight of the detected object. The probability of colliding with the detected object over a period of time is determined as the probability of the stochastic process crossing the straight line with the direction and velocity of the stochastic process.

10 Claims, 9 Drawing Sheets

METHOD, COMPUTER PROGRAM AND DEVICE FOR DETERMINING THE RISK OF MIDAIR COLLISION

CROSS-REFERENCE TO RELATED APPLICATIONS

This application claims priority to European patent application 07116447.9 filed 14 Sep. 2007.

TECHNICAL FIELD

The invention relates to a method, computer program and device to determine the probability of midair collision of vehicles. In particular, the invention relates to determine the risk of collision in unmanned vehicles.

BACKGROUND ART

A fundamental problem arising when operating unmanned aerial vehicles (UAVs) is how to avoid mid-air collisions autonomously using on-board sensors. Today, depending on the type of airspace and aircraft, manned aircraft either resort to automatic transponder-based collision avoidance systems like TCAS (commercial airliners), or the pilot's eyes for smaller aircraft using Visual Flight Rules (VFR). Operating UAVs today usually require segregated airspace keeping out from civilian air traffic. The next generation UAVs need to be able to fly autonomously in civilian air space and therefore also need an autonomous collision avoidance system that detects both transponder-based vehicles as well as other aircraft without transponders (parachuters, gliders, other UAVs, etc).

Manned aircraft flying in controlled airspace maintain a safe distance between each other using the service provided by an Air Traffic Control (ATC). ATC informs and orders human pilots to perform manoeuvres in order to avoid Near-MidAir Collisions (NMAC). The last decade semi-automatic systems like ACAS (Airborne Collision Avoidance System) have been implemented that essentially moves this responsibility from ATC to the pilot. ICAO (International Civil Aviation Organization) stipulates that all manned aircraft with more than 19 passengers carry an ACAS system. The present implementation of ACAS (called TCAS II) gives the pilot a warning (e.g. "climb, climb") and a so called Resolution Advice (RA) when the risk of collision between two aircraft exceeds a certain threshold. The pilot then performs the recommended manoeuvre manually. A transponder based link ensures that the RA given to the pilots on both aircraft is such that the best manoeuvre is taken jointly to avoid a collision.

The ACAS/TCAS system, however, assumes that both aircraft exchanges data on speed, height and bearing over a data link and that both systems cooperate. When operating small UAVs this assumption is often no longer valid. A typical UAV operates on altitudes where small intruding aircraft are often present that do not carry transponders. This paper describes a method for detecting hazardous situations based on data from a passive bearings-only sensor.

One of the most important dichotomies is the choice of state vector propagation: Nominal, worst-case or probabilistic. The probabilistic approach provides a framework that allows combining the naturally occurring uncertainties in measurements in a stringent framework.

A challenge with bearings-only measuring sensors is how to deal with the significant uncertainty obtained in estimated relative distance. One approach to increase accuracy in the distance estimate is to perform own platform manoeuvres.

In Monte-Carlo methods the probabilities are calculated for multiple points of an uncertain area around the detected object. Monte Carlo methods are known to be able to approximate probabilities arbitrarily well. They are also known to be computer intensive particularly when the underlying probabilities are small.

The object of the invention is to provide a method to compute a probability of near midair collision between two vehicles/objects that may be performed on a vehicle in real time.

SUMMARY OF THE INVENTION

Embodiments of the present invention address the problem of providing a method for enable a computation of a near mid air collision on a vehicle in real time.

The invention discloses a method for determining the probability of a vehicle colliding with a detected object comprising the step of: detecting the object, determining a stochastic process representing a relative distance between the vehicle and the detected object, the stochastic process having a direction and a velocity relative the vehicle, defining a safety zone of the vehicle in relation to the detected object as a straight line perpendicular to a line of sight of the detected object, and determining the probability of colliding with the detected object over a period of time as the probability of the stochastic process crossing the straight line with the direction and velocity of the stochastic process.

In an embodiment, the step of detecting the object comprises capturing an image by means of an optical sensor mounted on the vehicle and registering the object in the image, furthermore does the method comprise the steps of: determining the relative position and velocity of the detected object, and thereby a position, a direction and velocity relative the vehicle, by a target tracking unit arranged in the vehicle, and determining the probability of colliding with the detected object over a period of time by considering the stochastic process and the probability of colliding with the detected object is set to be the probability of the stochastic process, with the position as an initial value, crossing the straight line taken the direction and velocity from the target tracking unit as the direction and velocity of the stochastic process.

Furthermore, the determining of the probability may further involve a coordinate system that is rotated such that the x-axis of the coordinate system is aligned with the x-axis of coordinate system and that the straight line of the safety zone has two end points and defining a predetermined length of the line and that the straight line is perpendicular to the x-axis of the coordinate system.

In addition, the safety zone may be defined by a rectangular or an elliptic plane toward the detected object and the stochastic process is defined as a three dimensional entity and that the coordinate system further comprises a z-axis.

In an embodiment, the collision, near mid-air collision (NMAC), between the vehicle and the object may be expressed, in a two dimensional system, as $$NMAC_{(0,T)} \Leftrightarrow \min_{0<t<T} \|s(t)\| < R \cap \|s(0)\| > R,$$

where
s=distance between vehicle and object,
R=half the predetermined length of the safety zone $$\|s(t)\| = \sqrt{s_x^2(t) + s_y^2(t)},$$

and the probability of a collision, P(NMAC), is formulated as $$P(\text{NMAC}_{(0,T)}) \approx P(\tau|v_y|<R \cap \tau<T),$$

where
τ=represents the time it takes for the distance in the x-direction to become at least R
v=velocity In addition may the collision, near mid-air collision (NMAC), between the vehicle and the object may be expressed, in a three dimensional system, as $$NMAC_{(0,T)} \Leftrightarrow \min_{0<t<T} \|s(t)\| < R \cap \|s(0)\| > R,,$$

where
s=distance between vehicle and object,
R=half the predetermined length of the safety zone $$\|s(t)\| = \sqrt{s_x^2(t)+s_y^2(t)+s_z^2(t)}$$

and the probability of a collision, P(NMAC), is formulated as $$P(\text{NMAC}_{(0,T)}) \approx P(\tau|v_y|<R \cap \tau|v_z|<R \cap \tau<T)$$

where
τ=represents the time it takes for the distance in the x-direction to become at least R
v=velocity Furthermore, the collision, near mid-air collision (NMAC), between the vehicle and the object may also be expressed, wherein the safety zone has an elliptic plane towards the detected object, as $$NMAC_{(0,T)} \Leftrightarrow \min_{0<t<T} \|s(t)\| < R \cap \|s(0)\| > R,,$$

where
s=distance between vehicle and object,
R=the radius of the safety zone $$\|s(t)\| = \sqrt{s_x^2(t)+s_y^2(t)+s_z^2(t)}$$

and the probability of a collision, P(NMAC), is formulated as $$P(\text{NMAC}_{(0,T)}) \approx P(z\sqrt{v_y^2+v_z^2}<R \cap z<T)$$

where
τ=represents the time it takes for the distance in the x-direction to become at least R
v=velocity An embodiment further discloses a computer program product that when executed on a computer unit, such as a processor, executes the method as such.

Additionally, a processor with a computer program product, as stated above, installed thereon is disclosed.

An embodiment shows an unmanned vehicle comprising an optical sensor, a target tracking unit, and a processor in accordance with the above.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF EMBODIMENTS OF THE INVENTION

The method in this paper does not rely on accurate distance estimates. The reason is that the method is based on computed cumulative probability of NMAC. Cumulative probability here means that we consider the probability of NMAC over an arbitrary period of time. The method of cumulative probability is robust to large uncertainties, as opposed to a method based on instantaneous probability of NMAC where large uncertainties tend to diminish the resulting probability. The instantaneous probability of NMAC is computed as the probability of the relative position at a time t being within the safety zone. A cumulative probability of NMAC based on this instantaneous probability is not easily obtained because of strong dependence between NMAC at different time instants.

The invention makes use of theory for stochastic processes and level crossings. A stochastic process is a random process. The event corresponding to NMAC can be seen as a level crossing of a safety zone. By appropriate approximations of the safety zone the cumulative probability of NMAC becomes computationally tractable. The situation implies large initial uncertainties, typically as a result of tracking intruders based on angle-only sensors. In an embodiment the determination is extended to three dimensions.

Figure 10:
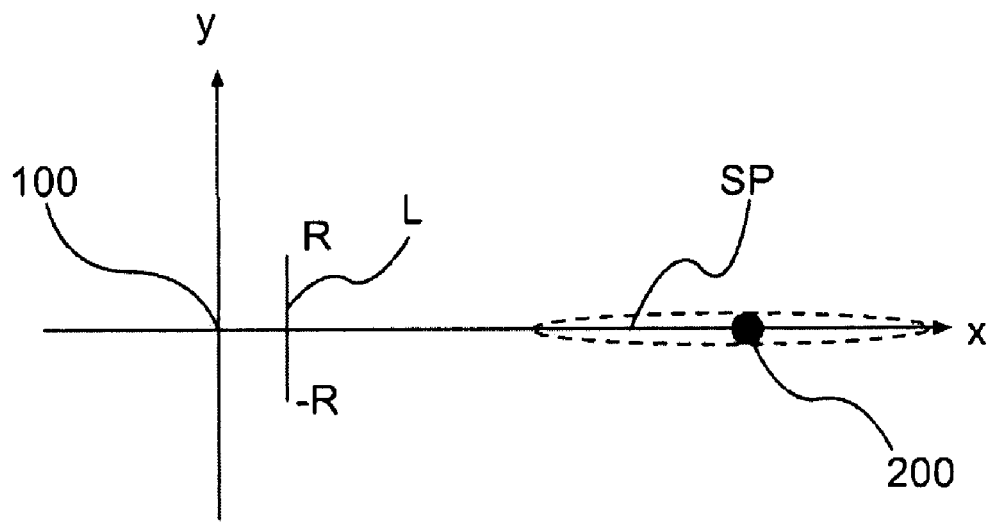
FIG. 10 is a schematic geometry of the invention,
FIG. 11 discloses an arrangement of a vehicle to determine the probability of colliding with a detected object.

An embodiment relates to a method for determining the probability of a detected object colliding with a vehicle based on data from an optical sensor such as a camera or the like arranged on the vehicle. From an image taken by a camera or the like one can determine the angle to the object with pretty good accuracy but it is very hard to determine a distance to the object. By modelling relative distance as a stochastic process the large distance uncertainty is included in a natural way. The detected object will represent an area/volume as shown in FIG. 10. The detected object is placed within a coordinate system that is rotated in a way that the object is aligned with an x-axis of the coordinate system. The determination further involves approximating a safety zone of the vehicle as a straight line of a predetermined length, 2R, having end points R,R and R, −R in the coordinate system, wherein the straight line crosses the x-axis. In the illustrated example the safety zone line is perpendicular to the x-axis. In the embodiment of extending the calculation to three dimensions the safety zone limit line is a plane perpendicular to the detected object forming, for example, a puck volume or an elliptic volume, that surrounds the vehicle. Independent of the shape one may approximate the crossing area toward the detected object as a rectangular or an elliptical area.

By taken into account the relative velocity, that gives direction, and velocity of the object, the probability of the stochastic process coming in contact with said line, with the end points (R,R) or (R,−R), is calculated in a processor arranged at the vehicle. The relative velocity and the relative position may be read from a target tracking unit, such as a kalman filter or the like, that calculates the direction and velocity of the object based on a sequence of, for example, recorded images.

The result of the calculation may then be used in order to perform an evasive action, such as to steer away from the object or to determine no evasive action is needed. Below will the theory of the calculation and embodiments be described:

Theory for Extremes and Level-Crossings

Consider a stochastic process $\{x(t), t \in R\}$ with density $f_{x(t)}(x)$. We are interested in the distribution of the minimum of the process, or actually the probability that the minimum is less than a certain level, i.e.

$$P\left(\min_{0 \leq t \leq T} x(t) < u\right). \quad (1)$$

In general it is difficult to compute (1), but we can use the fact that if $x(0) > u$ then for $\min_{0 \leq t \leq T} x(t) < u$ to become true there must be at least one down-crossing of level u, i.e.

$$P\left(\min_{0 \leq t \leq T} x(t) < u\right) = P((x(0) > u) \cap (N_{(0,T)}^-(x, u) \geq 1)) + P(x(0) < u), \quad (2)$$

where $N_{(0,T)}^-(x,u)$ is the number of down-crossings. Moreover, (2) can usually be approximated well by $$P\left(\min_{0 \leq t \leq T} x(t) < u\right) \leq P(N_{(0,T)}^- \geq 1) + P(x(0) < u) \leq E[N_{(0,T)}^-] + P(x(0) < u) \quad (3)$$

where $N_{(0,T)}^-$ is short for $N_{(0,T)}^-(x,u)$. Assume x(t) have absolutely continuous sample paths, i.e.

$$x(t) = \int_{-\infty}^{t} y(s) ds, \quad (4)$$

where y(s) is an integrable function. Then the expected value for the number of down-crossings $E[N_{(0,T)}^-]$ can be computed using Rice's formula, see Theorem 1.

Theorem 1 (Rice's formula extended) For any stochastic process $\{x(t), t \in R\}$ with absolutely continuous sample paths and absolutely continuous distribution, the down-crossings intensity of a level u is given by $$E[N_{(0,T)}^-(x, u)] = \int_0^T \int_{-\infty}^0 -z f_{x(t)\dot{x}(t)}(u, z) dz dt, \quad (5)$$

where $f_{x(t)\dot{x}(t)}(\cdot,\cdot)$ is the joint probability density for the process x(t) and its derivative $\dot{x}(t)$.

Probability of Collision in One Dimension

Level-Crossings in One Dimension

The probability of NMAC in one dimension, $NMAC^{1-D}$, can be formulated as an extreme value problem according to $$P(NMAC_{(0,T0)}^{1-D}) = P\left(\min_{0<t<T} s(t) < R \cap s(0) > R\right), \quad (6)$$

where (0,T) is the period of time under consideration. Moreover, s(t) is a stochastic process representing the relative distance between the two objects and R is the minimum safety distance. We are only interested in a potential NMAC in the future, thereby the added condition s(0)>R. This problem formulation is appealing in such a way that if the relative distance s(t) for any t falls below R, no matter for how long, we have a NMAC. Using the theory from above, we have that $$P(NMAC_{(0,T)}) = P(s(0) > R \cap n_{(0,T)}^- \geq 1) \leq E[N_{(0,T)}^-], \quad (7)$$

where $$E[N_{(0,T)}^-] = \int_0^T \int_{-\infty}^0 -v f_{s(t),\dot{s}(t)}(R, v) dv dt, \quad (8)$$

The probability of NMAC is the given by Lemma 1.

Lemma 1 (Probability of down-crossing of a given level) For a stochastic process $\{x(t), t \in R\}$ with $\dot{s}(t) = v(0)$ the probability of a down-crossing of a level R within T sec is given by $$P(s(0) > R \cap N_{(0,T)}^- \geq 1) = P(N_{(0,T)}^-(s, R) = 1) \quad (9)$$

$$= \int_R^\infty \int_{-\infty}^{-\frac{s-R}{T}} p_{s(0),v(0)}(s, v) dv ds,$$

where $P_{s(0),v(0)}(s,v) dvds$ is the joint probability function for S(0) and v(0).

Proof: See Example 1 and 2.

Example 1 Exact Probability of NMAC

Consider the one-dimensional double integrator, i.e.

$$\dot{s}=v, P_{s(0)}(s)=N(m_s,\sigma_s^2).$$

$$\dot{v}=0, P_{v(0)}(v)=N(m_v,\sigma_v^2), \quad (10)$$

assuming $S(0)$ and $v(0)$ are uncorrelated. The following reasoning will provide us with an expression for $P(NMAC_{(0,T)})$.

Due to $v(t)=v(0)$, for a down-crossing to occur we must have $s(0)>R$. Moreover, the constant velocity means that there can never be two or more down-crossings, i.e.

$$P(s(0)>R \cap N_{(0,T)}^- \leq 1) = P(N_{(0,T)}^- = 1). \quad (11)$$

Figure 1:
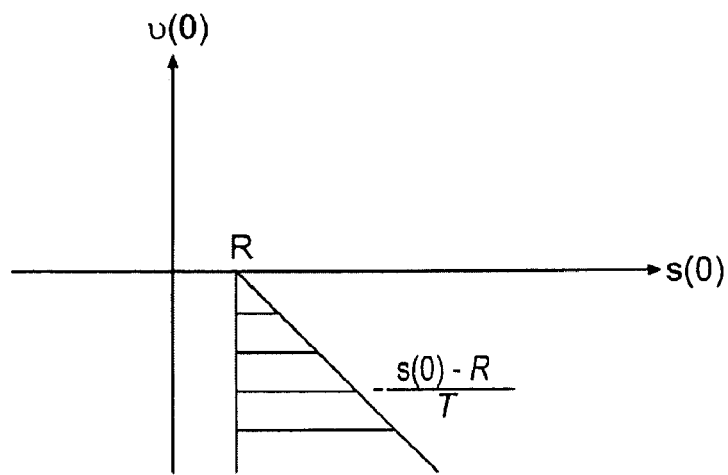
FIG. 1 shows a diagram representing where a down crossing will occur.

Given $s(0)>R$, for a down-crossing to occur within the time frame $0 \leq t \leq T$ the velocity needs to be $$-\infty \leq v(0) \leq -\frac{s(0)-R}{T}, \quad (12)$$

see FIG. 1. The probability for this to happen is $$\frac{1}{\sqrt{2\pi}\,\sigma_v} \int_{-\infty}^{-\frac{s(0)-R}{T}} e^{-\frac{(v-m_v)^2}{2\sigma_v^2}} dv = \Phi\left(\frac{R-s(0)-m_v T}{\sigma_v T}\right). \quad (13)$$

Now, taking into account that the position $s(0)=s$ is also stochastic we have that $$P(N_{(0,T)}^- = 1) = \frac{1}{2\pi\sigma_s\sigma_v} \int_R^\infty e^{-\frac{(s-m_s)^2}{2\sigma_s^2}} \quad (14)$$

$$\left( \int_{-\infty}^{-\frac{s-R}{T}} e^{-\frac{(v-m_v)^2}{2\sigma_v^2}} dv \right) ds$$

$$= \frac{1}{\sqrt{2\pi}\,\sigma_s} \int_R^\infty e^{-\frac{(s-m_s)^2}{2\sigma_s^2}} \Phi\left(\frac{R-s-m_v T}{\sigma_v T}\right) ds$$

$$= \frac{1}{\sigma_s} \int_R^\infty \phi\left(\frac{s-m_s}{\sigma_s}\right) \Phi\left(\frac{R-s-m_v T}{\sigma_v T}\right) ds$$

and therefore $$P(NMAC_{(0,T)}) = \frac{1}{\sigma_s} \int_R^\infty \phi\left(\frac{s-m_s}{\sigma_s}\right) \Phi\left(\frac{R-s-m_v T}{\sigma_v T}\right) ds \quad (15)$$

FIG. 1: A down-crossing will occur within $(0,T)$ sec if $s(0)$ and $v(0)$ are located somewhere in the marked area.

Example 2 Probability of NMAC Using Rice Formula

The same result for $P(NMAC_{(0,T)})$ as in (15) is obtained using the expression for expected value of the number of down-crossings, i.e.

$$E[N_{(0,T0)}^-] = \int_0^T \int_{-\infty}^0 -v p_{s(t),v(t)}(R,v) \, dv \, dt \quad (16)$$

Using the change of variables $$\begin{bmatrix} s(t) \\ v(t) \end{bmatrix} = \begin{bmatrix} 1 & t \\ 0 & 1 \end{bmatrix} \begin{bmatrix} s(0) \\ v(0) \end{bmatrix}, \quad (17)$$

the joint probability for $s(t)$ and $v(t)$, assuming $s(0)$ and $v(0)$ are independent, is $$P_{s(t),v(t)}(s,v) = P_{s(0),v(0)}(s-vt,v) = P_{s(0)}(s-vt) P_{v(0)}(v). \quad (18)$$

With the assumption that $s(0)$ and $v(0)$ are distributed according to (10) we have $$p_{s(t),v(t)}(s,v) = \frac{1}{2\pi\sigma_s\sigma_v} e^{-\frac{(s-vt-m_s)^2}{2\sigma_s^2}} e^{-\frac{(v-m_v)^2}{2\sigma_v^2}}. \quad (19)$$

Plugging (19) into (16) we get $$E[N_{(0,T0)}^-] = \frac{1}{2\pi\sigma_s\sigma_v} \int_0^T \int_{-\infty}^0 -v e^{-\frac{(s-vt-m_s)^2}{2\sigma_s^2}} e^{-\frac{(v-m_v)^2}{2\sigma_v^2}} dv \, dt. \quad (20)$$

With a change of variables according to $$\begin{bmatrix} x \\ y \end{bmatrix} = \begin{bmatrix} vt \\ v \end{bmatrix}, \quad (21)$$

(20) is transformed to $$E[N_{(0,T0)}^-] = \frac{1}{2\pi\sigma_s\sigma_v} \int_{-\infty}^0 \int_{-\infty}^{\frac{x}{T}} e^{-\frac{(s-x-m_s)^2}{2\sigma_s^2}} e^{-\frac{(v-m_s)^2}{2\sigma_v^2}} dy \, dx \quad (22)$$

$$= \frac{1}{\sigma_s} \int_R^\infty \phi\left(\frac{s-m_s}{\sigma_s}\right) \Phi\left(\frac{R-s-m_v T}{\sigma_v T}\right) ds$$

which is identical to (15).

$P(N_{(0,T0)}^- = 1)$ with corr

In this section we use the theory from above to cover the more important case of correlated random variables. Assume the process $s(t)$ and its derivate $\dot{s}(t)$ have stochastic initial values $s(0)$ and $v(0)$ respectively, but once $s(0)$ and $v(0)$ are determined the process is exactly predictable. This means for one thing that $$P(N_{0,T0}^- = 1) = E[N_{(0,T)}^-]. \quad (23)$$

Moreover, assume $s(0)$ and $v(0)$ are two normally distributed, mutually correlated variables, then $P(N_{(0,T,0)}^-)=1$ is given by Lemma 2.

Lemma 2 (Probability of down-crossing with correlated variables) For a stochastic process $\{s(t), t \in R\}$ with $\dot{s}(t)=v(0)$ and $$\begin{bmatrix} s(0) \\ v(0) \end{bmatrix} \sim N\left(\begin{bmatrix} m_s \\ m_v \end{bmatrix}, \begin{bmatrix} \sigma_s^2 & \rho\sigma_s\sigma_v \\ \rho\sigma_s\sigma_v & \sigma_v^2 \end{bmatrix}\right), \quad (24)$$

the probability of a down-crossing of a level R within T sec is given by $$P(N_{(0,T)}^- = 1) = \frac{1}{2\pi(1-\gamma^2)^{\frac{1}{2}}} \int_{\frac{m_v}{\sigma_s}}^{\infty} \int_h^{\infty} e^{-\frac{u^2-2\gamma uv+v^2}{2(1-\gamma^2)}} du\, dv - \quad (25)$$

$$\frac{1}{2\pi(1-\rho^2)^{\frac{1}{2}}} \int_{\frac{m_v}{\sigma_v}}^{\infty} \int_{\frac{m_s-R}{\sigma_s}}^{\infty} e^{-\frac{u^2-2\rho uv+v^2}{2(1-\rho^2)}} du\, dv$$

or $$P(N_{(0,T)}^- = 1) = \frac{1}{2\pi(1-\eta^2)^{\frac{1}{2}}} \int_{-\frac{m_s-R}{\sigma_s}}^{\infty} \int_h^{\infty} e^{-\frac{u^2-2\eta uv+v^2}{2(1-\eta^2)}} du\, du \quad (26)$$

where $$h = \frac{m_s - R + m_v T}{\sqrt{\sigma_v^2 T^2 + 2\sigma_s \sigma_v \rho T + \sigma_s^2}} \quad (27)$$

$$\gamma = \frac{\sigma_v T + \rho \sigma_s}{\sqrt{\sigma_v^2 T^2 + 2\rho \sigma_s \sigma_v T + \sigma_s^2}}$$

$$\eta = \frac{\rho \sigma_v T + \sigma_s}{\sqrt{\sigma_v^2 T^2 + 2\rho \sigma_s \sigma_v T + \sigma_s^2}}$$

Proof: See above

An important special case is when T→∞ representing P(N$_{(0,\infty)}^-$=1). From (26) and (27) we see that $$P(N_{(0,\infty)}^- = 1) = \frac{1}{2\pi(1-\rho^2)^{\frac{1}{2}}} \int_{-\frac{m_s-R}{\sigma_s}}^{\infty} \int_{\frac{m_v}{\sigma_v}}^{\infty} e^{-\frac{u^2-2\rho uv+v^2}{2(1-\rho^2)}} dv\, du \quad (28)$$

Computing P(NMAC$_{(0,T)}^{1-D}$)

The probability P(N$_{(0,T)}^-$=1) in (25) and (26) are not possible to compute exactly. However, there exist a number of methods which provide approximate yet accurate solutions and some simple methods are elaborated on below.

The direct approach is to use a Monte-Carlo method, i.e. to draw N samples from the respective distributions of the random variables and approximate the probability with the outcome of the sampling. Denote the true value of the sought probability with p. The set of samples is binomial distributed, $$\{\#samples \leq x\} \sim Bin(N,p). \quad (29)$$

but for a large enough N, usually Np(1−p)>20 is adequate, the probability is approximated well by $$P(\cdot) = \frac{\{\# \text{ samples} \leq s\}}{N} \sim N(p, \sigma^2), \quad (30)$$

$$\sigma^2 = \frac{p(1-p)}{N}.$$

For a relative mean square error $$N \geq \frac{1-p}{\varepsilon^2 p} \approx \frac{1}{\varepsilon^2 p} \quad (31)$$

we can write needed number of sample according to $$\varepsilon \leq \frac{\sigma}{p}$$

where the last approximation is valid for small p. Assume p=−0.01 and 3ε≦0.1, i.e. a relative error smaller than 10% with probability 0.997. These values plugged into (31) suggests that we must use N≧90000. For many on-line applications this means a too high computational load.

To compute the one-dimensional normal distribution Φ(•) a very accurate result is given by $$\Phi(a) = \frac{1}{\sqrt{2\pi}} \int_{-\infty}^{a} e^{-\frac{x^2}{2}} dx = \sqrt{\frac{1}{4} - \frac{7e^{-\frac{a^2}{2}} + 16e^{a^2(\sqrt{2}-2)} + \left(7 + \frac{\pi a^2}{4}\right)e^{-a^2}}{120}} + \frac{1}{2}, \quad (32)$$

for a ≧0. According to [17] the relative error in (32) is less than 3×10$^{-4}$, which is much better compared to using a sampling-based method with a tractable amount of samples.

To compute P(N$_{(0,T)}^-$=1), which according to (25) and (26) is a two-dimensional normal distribution, we can not apply (32) directly. However, a very simple and accurate approximation to (25) exists if we know that m$_v$/σ$_v$ is large. Completing the squares for u and approximating the integral with respect to u with one yields $$P(N_{(0,T)}^- = 1) \approx \Phi(-h) - \Phi\left(-\frac{m_s - R}{\sigma_s}\right) \quad (33)$$

which can be computed using (32). See FIG. 2 for a comparison. Similarly, an accurate approximation to 26 exists if we know that m$_s$/σ$_s$ is large. Completing the squares for u and approximating the integral with respect to u with one yields $$P(N_{(0,T)}^- = 1) \approx \Phi(-h), \quad (34)$$

which can be computed using 32. See FIG. 2 for a comparison.

A better, yet simple approximation to (26) is given by [18]. The probability from 26 with k=−(m$_s$−R)/σ$_s$ and h and η is written according to $$P(N_{(0,T)}^- = 1) = P(u > k, v > h) \quad (35)$$

$$= P(v > h) - P(u < k, v > h)$$

$$= P(v > h) - P(u < k)P(v > h | u < k)$$

$$= \Phi(-h) - \Phi(k)E\left[\Phi\left(-\frac{h - \eta u}{\sqrt{1-\mu^2}}\right) u < k\right].$$

The approximation consists of replacing u under the expectation in (35) with its conditional expectation $$\mu(k) = E[u | u < k] = -\frac{\varphi(k)}{\Phi(k)}, \quad (36)$$

hoping that u is rather constant for u<k. This means that (35) is approximated with $$P(N^-_{(o,T)} = 1) \approx Pcw(N^-_{(0,T)} = 1) \qquad (37)$$

$$= \Phi(-h) - \Phi(k)\Phi\left(\frac{\eta\mu(k)-h}{\sqrt{1-\eta^2}}\right),$$

where $\Phi(\bullet)$ is computed using (32). See FIG. 2 for a comparison.

4 Extending the Theory to Two Dimensions

Conditions for NMAC in Two Dimensions

Figure 3:
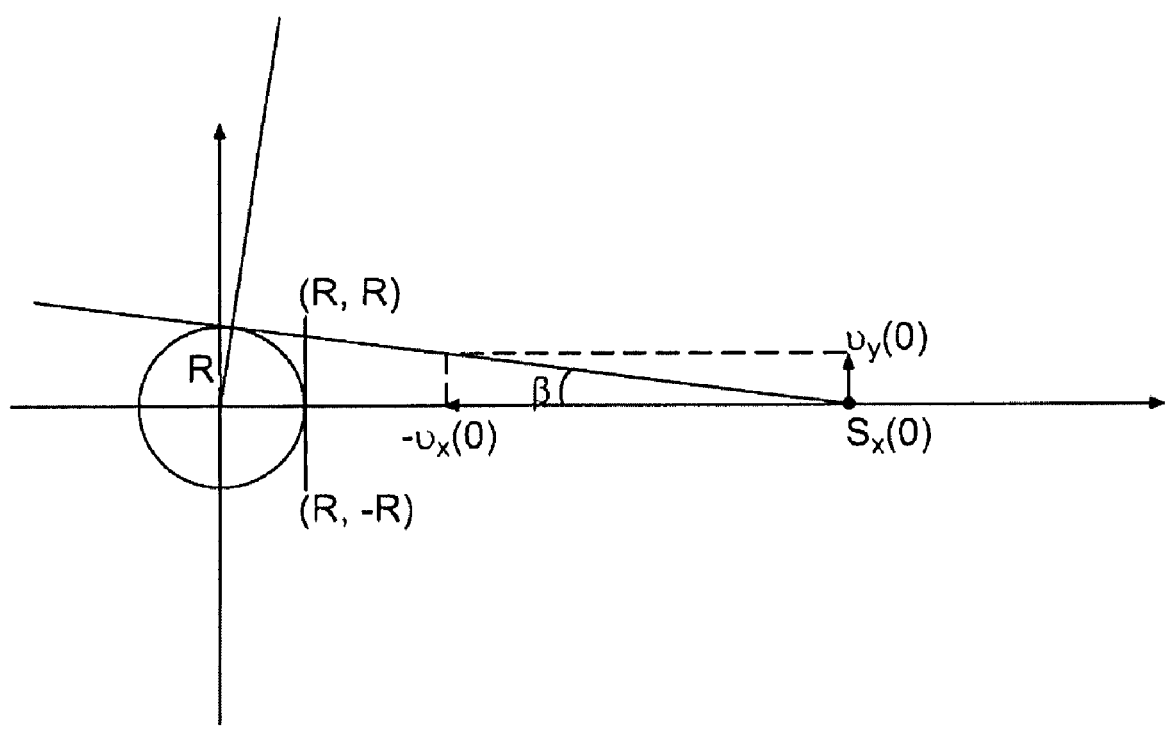
FIG. 3 shows a geometry for the limit of NMAC in two dimensions.

Similar to the one-dimensional case, NMAC in two dimensions, $NMAC^{2-D}$, can be formulated as an extreme value problem according to $$NMAC^{2-D}_{(0,T)} \Leftrightarrow \min_{0<t<T} \|s(t)\| < R \cap \|s(0)\| > R, \qquad (38)$$

where $\|s(t)\| = \sqrt{s_x^2(t) + s_y^2(t)}$. Assume that we know initial relative position s(0) and velocity v(0) exactly, and that the velocity is constant v(t)=v(0). The coordinate system is rotated such that line of sight (LOS) is aligned with the x-axis, yielding $s_y(0)=0$. Under the conditions above a useful geometric interpretation of (38) is as follows. For a NMAC to occur sometime in the future the initial position along LOS $s_x(0)$ and the angle β between LOS and velocity must be such that $$s_x(0)|\sin \beta| < R, \qquad (39)$$

compare with FIG. 3. Note that we must also require the position and velocity to be $$s_x(0) > R \cap v_x(0) < 0. \qquad (40)$$

The expression according to (39) is for infinite time horizons. If we consider a finite time horizon T we must include $$\frac{l}{\sqrt{v_x^2(0) + v_y^2(0)}} < T, \qquad (41)$$

where the length l is from $s_x(0)$ to intersection with the circle and is given by $$l = s_x(0)\cos \beta - \sqrt{R^2 - s_x^2(0)\sin^2\beta}. \qquad (42)$$

When s(0) and v(0) are random variables we compute the probability for NMAC according to $$P(NMAC_{(0,\infty)}) = P(s_x(0)|\sin \beta| < R \cap \Delta), \qquad (43)$$

where $$\Delta = s_x(0) > R \cap v_x(0) < 0. \qquad (44)$$

Note that (43) is valid under the assumption that the bearing to the object is measured very accurately, i.e. we know the object is located somewhere along line of sight. A very accurate bearing together with a coordinate system rotated such that the x-axis is aligned with line of sight means that $s_y(0) \approx 0$. If $s_y(0) \approx 0$ is not a valid assumption (43) would change to $$P(NMAC_{(0,\infty)}) = P|s_x(0)\sin \beta + s_y(0)\cos \beta| < R \cap \Delta). \qquad (45)$$

Here we assume the bearing measurements are accurate enough for the assumption to hold. The corresponding expression for a finite time horizon is $$P(NMAC_{(0,T0)}) = P\left(s_x(0)|\sin\beta| < R \cap \frac{l}{\sqrt{v_x^2 + v_y^2}} < T \cap \Delta\right), \qquad (46)$$

where l is given by (42).

Unfortunately, (43) and particularly (46) are difficult to compute analytically when the involved random variables are normally distributed. An approach to overcome this difficulty is to consider the crossing of a line with end points (R, −R_ to (R,R) instead of intersection with the circle, see FIG. 3. A good approximation for NMAC to occur is to say the relative position must cross this finite line, i.e.

$$(s_x(0)-R)|\tan \beta| < R, \qquad (47)$$

assuming Δ is true. Define a random variable τ according to $$\tau = \begin{cases} \frac{s_x(0)-R}{-v_x(0)} & \text{if } s_x(0) > 0 \cap v_x(0) < 0 \\ \infty & \text{otherwise} \end{cases} \qquad (48)$$

where τ represents the time it takes for the distance between the two objects along line of sight to decrease to R. Now we can formulate an approximate probability of $NMAC_{(0,T)}$ according to $$P(NMAC_{(0,T)}) \approx P(\tau | v_y| < R \cap \tau < T), \qquad (49)$$

i.e. given τ=t, if $|v_y|$ is not large enough for the distance in the y-direction to become at least R after t seconds there will be a NMAC. The right hand side in (49) is given by Lemma 3.

Lemma 3 (Probability of down-crossing of a given finite line) For a stochastic process $\{s(t)=|s_x(t)s_y(t)|^T, t \in R\}$ with $\dot{s}(t)=v(0), s_y(0)=0$ and $v_y(0)$ independent of $s_x(0)$ and $v_x(0)$ the probability of a down-crossing within T sec of a line with endpoints (R, R0 and (R,−R) is given by $$P(\tau|y_y| < R \cap \tau < T) = P|v_y| < \frac{R}{T})P(\tau < T) + \int_{R/T}^{\infty} (p_{v_y}(y) + p_{v_y}(-y)) P\left(\tau < \frac{R}{y}\right) dy \qquad (50)$$

where τ is defined according to (48) and $$P(\tau < T) = P(N_{(0,T)}^-(s_x,R) = 1). \qquad (52)$$

Proof: See below

Let T→∞ in (50) and we obtain the corresponding expression for an infinite time horizon, i.e.

$$P(NMAC_{(0,\infty)}) = \int_0^{\infty} )p_{v_y}(y) + p_{v_y}(-y))P\left(\tau < \frac{R}{y}\right) dy. \qquad (52)$$

Figure 2:
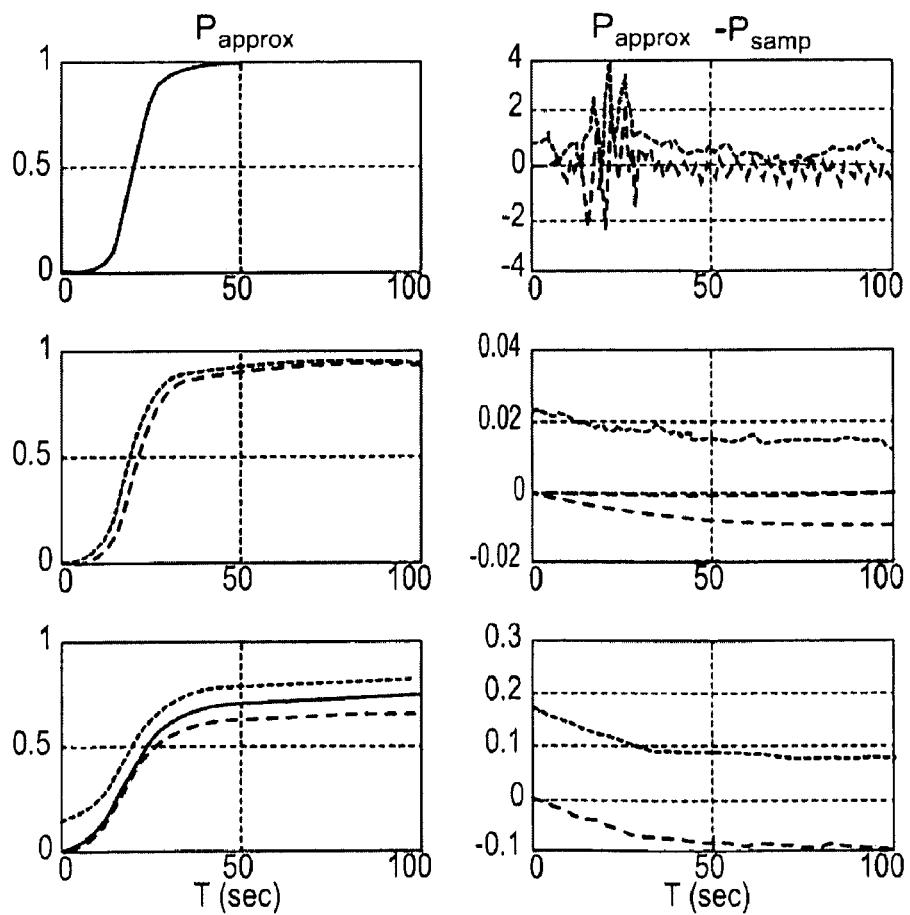
FIG. 2 shows a comparison between sampling-method (Monte Carlo) and two different variants of the method according to the invention.

FIG. 2: Comparison between $P(N_{(0,T)}^-=1$ computed using sampling with N=90000 (solid curve) and approximate expressions (31) (dashed), (32) (dotted) and (35) (dash-dotted). In all cases $m_s=2400$, $m_v=120$ and ρ=0.8. In the upper plots $\sigma_s=800$, $\sigma_v=40$, in the middle $\sigma_s=1200$, $\sigma_v=60$, and in the lower plots $\sigma_s=2400$, $\sigma_v=120$.

Computing $P(\text{NMAC}_{(0,T)}^{2-D})$

From (50) and (26), assuming the involved random variables $s_x$, $v_x$, and $v_y$ are normally distributed, we have $$P(\text{NMAC}_{(0,T)}) \approx \frac{1}{\sqrt{2\pi}} \int_{\frac{R}{T}}^{\infty} \frac{\phi\left(\frac{y-m_y}{\sigma_y}\right) + \phi\left(\frac{y+m_y}{\sigma_y}\right)}{\sigma_y \sqrt{1-\eta^2\left(\frac{R}{y}\right)}} \quad (53)$$

$$\int_{-\frac{m_s}{\sigma_s}}^{\infty} \int_{h\left(\frac{R}{y}\right)}^{\infty} e^{-\frac{s^2 - 2\eta s v + v^2}{2(1-\eta^2)}} \, dv \, ds \, dy +$$

$$\frac{1}{\sqrt{2\pi}} \frac{\Phi\left(\frac{\frac{R}{T}-m_y}{\sigma_y}\right) - \Phi\left(\frac{\frac{R}{T}-m_y}{\sigma_y}\right)}{\sqrt{1-\eta^2(T)}} \int_{-\frac{m_s}{\sigma_s}}^{\infty} \int_{h(T)}^{\infty} e^{-\frac{s^2 - 2\eta s v + v^2}{2(1-\mu^2)}} \, dv \, ds,$$

and $$h(t) = \frac{m_s - R + m_v t}{\sqrt{\sigma_v^2 t^2 + 2\sigma_s \sigma_v \rho t + \sigma_s^2}} \quad (54)$$

$$\mu(t) = -\frac{\rho \sigma_v t + \sigma_s}{\sqrt{\sigma_v^2 t^2 + 2\rho \sigma_s \sigma_v t + \sigma_s^2}}$$

The approximate expression for $P(N_{(0,T)}^- = 1)$ according to (37) yields $$P(\text{NMAC}_{(0,T)}) \approx \frac{1}{\sigma_y} \int_{R/T}^{\infty} \left( \phi\left(\frac{y-m_y}{\sigma_y}\right) + \phi\left(\frac{y+m_y}{\sigma_y}\right) \right) Pcw\left(\tau < \frac{R}{y}\right) dy + \quad (55)$$

$$\left( \phi\left(\frac{\frac{R}{T}-m_y}{\sigma_y}\right) - \phi\left(\frac{-\frac{R}{T}-m_y}{\sigma_y}\right) \right) Pcw(\tau < T),$$

The second term in (55) is straightforward to compute accurately using the approximation scheme according to (32). A simple and effective way of evaluating the integral is to apply Simpson's rule, i.e.

$$\int_{y^{(0)}}^{y^{(2M)}} f(y) \, dy = \frac{h}{3}((f(y^{(0)}) + 4(f(y^{(1)}) + \ldots + f(y^{(2M-1)})) + \quad (56)$$

$$2(f(y^{(2)}) + \ldots + f(y^{(2M-2)})) + f(y^{(2M)}) + R_M$$

where $$y^{(0)} = R/T, \quad y^{(2M)} = 4\sigma_y + m_y \quad (57)$$

and $$f(y^{(i)}) = \left( \phi\left(\frac{y^{(i)}-m_y}{\sigma_y}\right) + \phi\left(\frac{y^{(i)}+m_y}{\sigma_y}\right) \right) Pcw\left(\tau < \frac{R}{y^{(i)}}\right).$$

We know that by applying Simpson's rule according to (56) the rest term $R_M$ is less than $$R_M < \frac{Mh^5}{90} |f^{(4)}(\xi)|, \quad y^{(0)} \leq \xi \leq y^{(2M)}. \quad (58)$$

Figure 4:
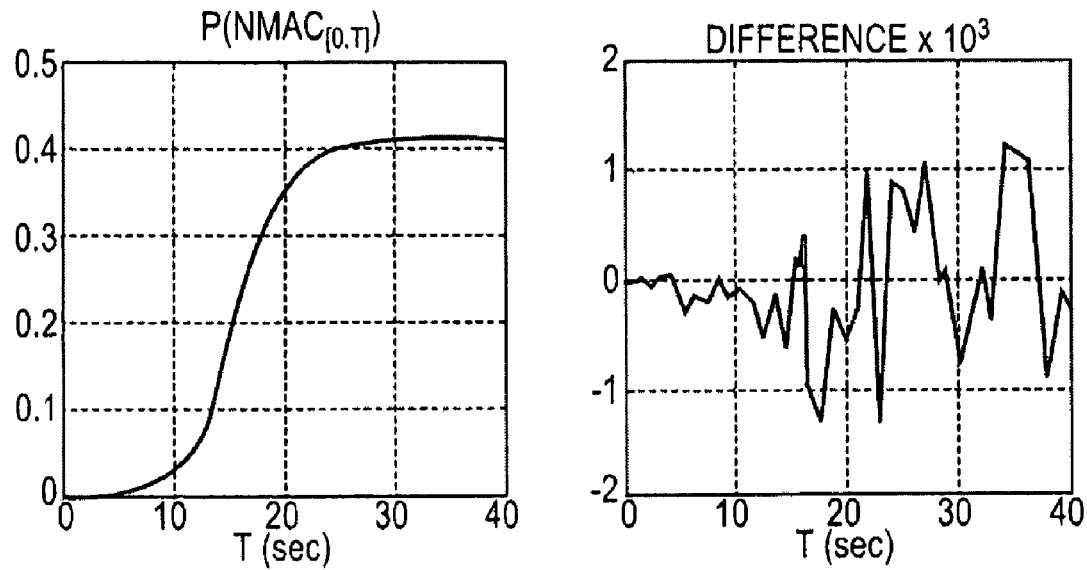
FIG. 4 shows a diagram of a probability of colliding with a detected object comparing the result using an embodiment of the invention with the result of a Monte Carlo method.
Figure 5:
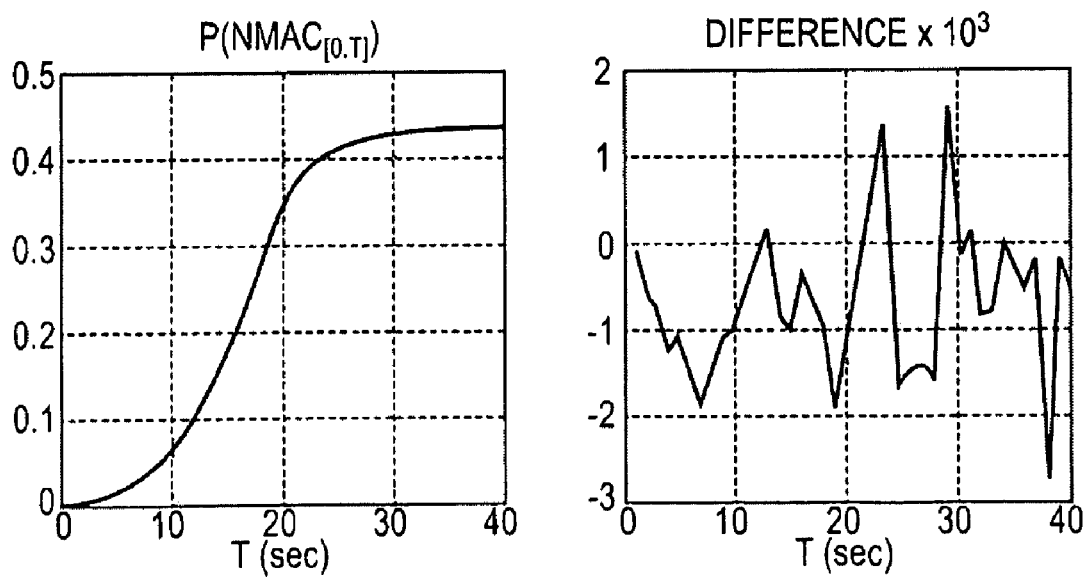
FIG. 5 shows a diagram of the probability of colliding with a detected object comparing the result using an embodiment of the invention with the result of a Monte Carlo method.

See FIGS. 4 and 5 for two examples using M=50. One can conclude that the approximation is slightly underestimating as $m_s/\sigma_s$ becomes smaller. However, this should be possible to compensate for using a modified approximation compared to (37) when $\eta$ is negative.

Figure 6:
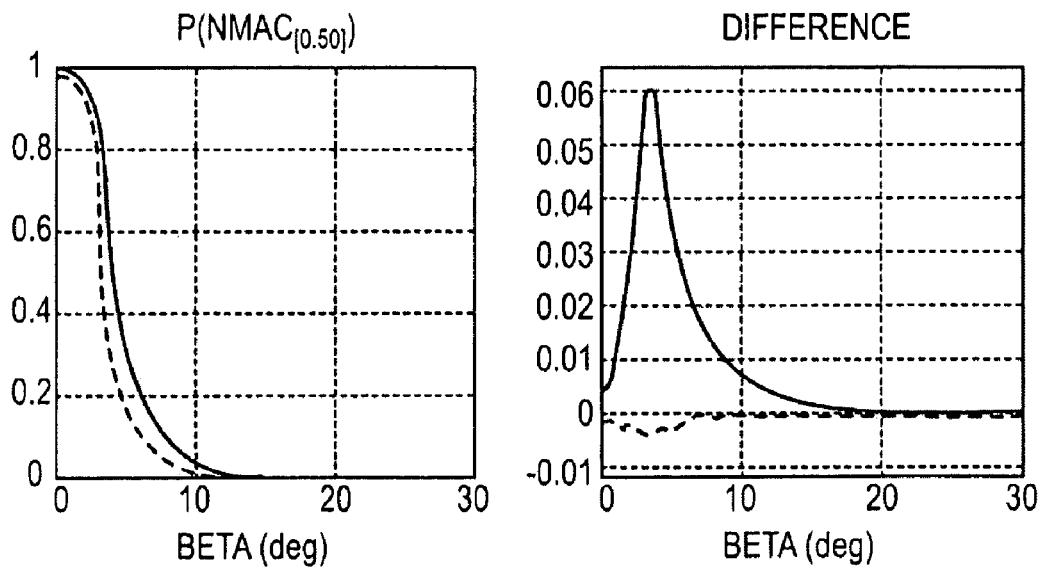
FIG. 6 is a diagram showing the probability of colliding with a detected object as a function of $$\beta = \arctan\frac{m_y}{m_x}$$
Figure 7:
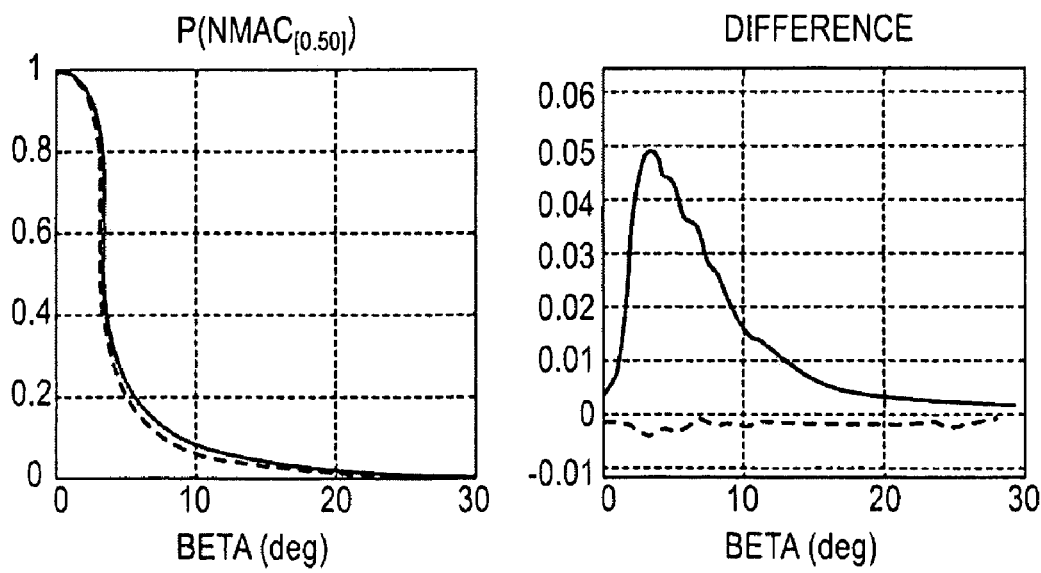
FIG. 7 is a diagram showing the probability of colliding with a detected object as a function of $$\beta = \arctan\frac{m_y}{m_x}$$
Figure 8:
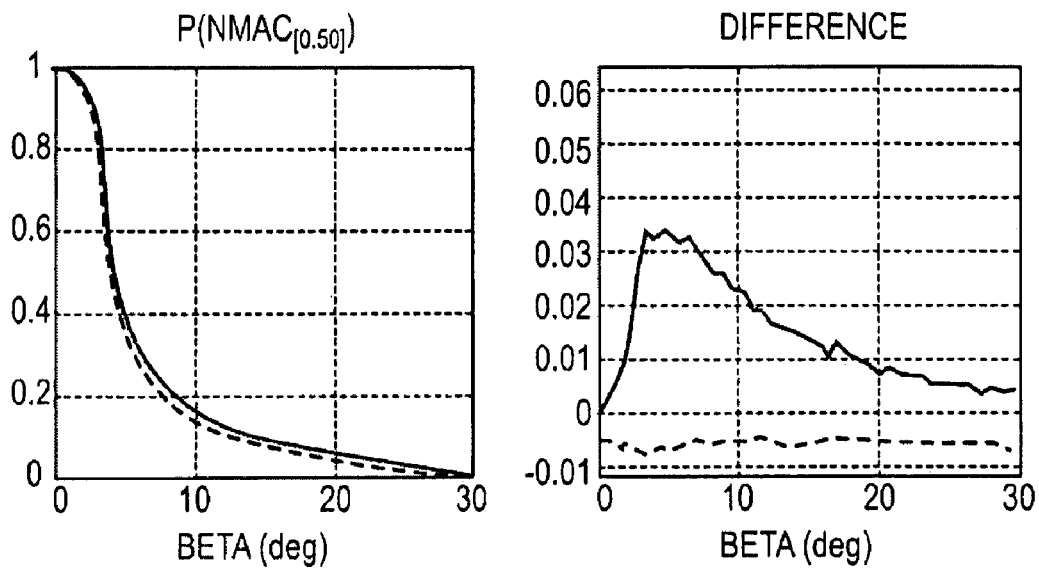
FIG. 8 is a diagram showing the probability of colliding with a detected object as a function of $$\beta = \arctan\frac{m_y}{m_x}$$

In the case we are interested in $P(\text{NMAC}_{(0,\infty)})$ the approximation with a line through $(R, -R)$ and $(R,R)$ becomes rather conservative. The smaller $m_s$ the worse is the approximation, particularly when $\tan \beta \approx R/(s_x(0)-R)$, compare with FIG. 3. A better approximation is possible if we consider crossing of the line $(0, -R)$ and $(0, R)$ instead. FIGS. 6, 7 and 8 show three comparisons between the approximate solution for $P(\text{NMAC}_{|0,50|})$ using both lines respectively and the result obtained using Monte Carlo simulation with respect to the circle. The evaluation is performed as a function of $$\beta = \arctan \frac{m_y}{m_x}.$$

FIG. 4: $\text{NMAC}_{(0,T)}$ based on (55) evaluated with Simpson's rule and M=50 (solid curve) compared to the Monte Carlo solution of (55) using 360000 samples (dashed curve). Here $m_s$=2400, $m_v$=120, $\sigma_s$=800, $\sigma_v$=40, $m_y$=9, $\sigma_y$=3 and $\rho$=0.8.

FIG. 5: $\text{NMAC}_{(0,T)}$ based on (55) evaluated with Simpson's rule and M=50 (solid curve) compared to the Monte Carlo solution of (55) using 360000 samples (dashed curve). Here $m_s$=2400, $m_v$=120, $\sigma_s$=1200, $\sigma_v$=60, $m_y$=9, $\sigma_y$=4.5 and $\rho$=0.8.

Dependence between $\tau$ and $v_y$

To deal with dependent between $v_y$ and $\tau$ we proceed as follows. Starting from (49) and changing the order of computation yields $$P(\text{NMAC}_{(0,T)}) = \int_{R/T}^{\infty} \int_0^{R/y} p_{v_y}(y) p_{\tau|v_y}(t|y) \, dt \, dy + \quad (59)$$

$$\int_{-R/T}^{R/T} \int_0^T p_{v_y}(y) p_{\tau|v_y}(t|y) \, dt \, dy + \int_{-\infty}^{-R/T} \int_0^{R/y} p_{v_y}(y)$$

$$p_{\tau|v_y}(t|y) \, dt \, dy = \int_{R/T}^{\infty} p_{v_y}(y) P\left(\tau < \frac{R}{|y|} \mid v_y = y\right) dy +$$

$$\int_{-R/T}^{R/T} p_{v_y}(y) P(\tau < T \mid v_y = y) \, dy +$$

$$\int_{-\infty}^{-R/T} p_{v_y}(y) P\left(\tau < \frac{R}{|y|} \mid v_y = y\right) dy.$$

In case of $s_x$, $v_x$ and $v_y$ are normally distributed, with mean and covariance $$\begin{bmatrix} m_s \\ m_v \\ m_y \end{bmatrix}, \begin{bmatrix} \sigma_s^2 & \rho_{sv}\sigma_s\sigma_v & \rho_{sy}\sigma_s\sigma_y \\ \rho_{sv}\sigma_s\sigma_v & \sigma_v^2 & \rho_{vy}\sigma_v\sigma_y \\ \rho_{sy}\sigma_s\sigma_y & \rho_{vy}\sigma_v\sigma_y & \sigma_y^2 \end{bmatrix}, \quad (60)$$

the distribution of $s_x$, $v_x | v_y$ is still normal with $$m_{sv|y} = \begin{bmatrix} m_s \\ m_v \end{bmatrix} + \frac{1}{\sigma_y} \begin{bmatrix} \rho_{sy}\sigma_s\sigma_y \\ \rho_{vy}\sigma_v\sigma_y \end{bmatrix} (y - m_y), \quad (61)$$

$$P_{sv|y} = \begin{bmatrix} \sigma_s^2 & \rho_{sv}\sigma_s\sigma_v \\ \rho_{sv}\sigma_s\sigma_v & \sigma_v^2 \end{bmatrix} - \frac{1}{\sigma_y^2} \begin{bmatrix} \rho_{sy}\sigma_s\sigma_y \\ \rho_{vy}\sigma_v\sigma_y \end{bmatrix} \begin{bmatrix} \rho_{sy}\sigma_s\sigma_y \\ \rho_{vy}\sigma_v\sigma_y \end{bmatrix}^T.$$

This means that for $P(\tau < T | v_y = y)$ we use (61) instead of $m_{sv}$ and $P_{sv}$ when computing $P(\tau < T)$.

FIG. 6: P(NMAC$_{(0,50)}$) as a function of $$\beta = \arctan\frac{m_y}{m_v}.$$

Approximate solution according to (55) using line through x=R and x=0 are shown by a solid and dashed line respectively, and the Monte Carlo solution of (46) ($\approx$0.01 at $\beta$=10.5) using 360000 samples is given by a dotted line. Here $S_x$=2400, $v_x$=120. $\sigma_s$=600, $\sigma_v$=30, $\rho$=0.8, $m_y$=$m_v$ tan $\beta$ and $\sigma_y$=$(m_y/m_s\sigma_s+m_s10^{-3})^{1/2}$.

Extending the Theory to Three Dimensions

The next step is to include the third dimension using the theory from Section above. Denote the third coordinate with z. As for the angle in the y-direction we assume that the angle along z is measured accurately meaning that $s_z(0)\approx0$. With a protected aone shaped line a puck, the exact conditions for NMAC are $$\text{NMAC}_{(0,\infty)} \Leftrightarrow s_x(0)|\sin\beta|<R_y \cap l|\tan\alpha|<R_z, \quad (62)$$

where $$\beta = \arctan\frac{v_y}{-v_x}, \quad (63)$$

$$\alpha = \arctan\frac{v_z}{\sqrt{v_x^2+v_y^2}},$$

$$l = s_x(0)\cos\beta - \sqrt{R_y^2 - s_x^2(0)\sin^2\beta}.$$

Note that the expression in (62) is only valid if the two vehicles are at the same altitude.

Similar to the 2-D case we approximate the crossings geometry, but here with a rectangle perpendicular to the line-of-sight. The probability for the event NMAC$_{(0,\infty)}^{3-D}$ is approximately equal to $$P(\text{NMAC}_{(0,\infty)}) \approx P((\tau|v_y|<R_y)\cap(\tau|v_z|<R_z)), \quad (64)$$

i.e. the distance traveled during the time $\tau$ must be shorter than both $R_y$ along the y-axis and $R_z$ along the z-axis. Assume $v_y$ and $v_z$ are independent of each other and of $s_x$ and $v_x$. The probability in (64) is then given by Lemma 4.

FIG. 7: PNMAC$_{(0,50)}$ as a function of $$\beta = \arctan\frac{m_y}{m_v}.$$

Approximate solution according to (55) using line through x=R and x=0 are shown by a solid and dashed line respectively, and the Monte Carlo solution of (46) ($\approx$0.01 at $\beta$=20 and $\approx$0.005 and $\beta$=30) using 360000 samples is given by a dotted line. Here $s_x$=2400, $v_x$=120, $\sigma_s$=800, $\sigma_v$=40, $\rho$=0.8, $m_y$=$m_v$ tan $\beta$ and $\sigma_y$=$(m_y/m_s\sigma_s+m_s10^{-3})^{1/2}$.

Lemma 4 (Probability of down-crossing of a given rectangle) For a stochastic process $\{s(t)=[s_x(t)s_y(t)s_z(t)]^T, t\in R\}$ with $\dot{s}(t)=v(0), s_x(0)=s_z(0)=0, v_y(0)$ and $v_z(0)$ the probability of a down-crossing within T sec of a rectangle with x-axis as its normal and side lengths of $R_y$ and $R_z$ is given by $$P((\tau|v_y|<R_y)\cap(\tau|v_z|<R_z)) = \quad (65)$$
$$\int_0^\infty (p_{v_y}(-y)+p_{v_y}(y))P\left(\tau<\frac{R_y}{y}\right)P\left(|v_z|<\frac{R_z}{R_y}y\right)dy +$$
$$\int_0^\infty (p_{v_z}(-z)+p_{v_z}(z))P\left(\tau<\frac{R_z}{z}\right)P\left(|v_y|<\frac{R_y}{R_z}z\right)dz,$$

where $\tau$ is defined according to (48) and $$P(\tau<T)=P(N_{(0,T)}^-(s_x,R)=1). \quad (66)$$

Proof: See below

Assuming normally distributed random variables (65) is equal to $$P(\text{NMAC}_{(0,\infty)}) \approx \frac{1}{\sigma_y}\int_0^\infty \left(\phi\left(\frac{y+m_y}{\sigma_y}\right)+\phi\left(\frac{y-m_y}{\sigma_y}\right)\right) \quad (67)$$

$$P\left(\tau<\frac{R_y}{y}\right)\left(\int_{-\frac{R_z}{R_y}y-m_z}^{\frac{R_z}{R_y}y-m_z}\frac{e^{-\frac{s^2}{2}}}{\sqrt{2\pi}}d\varsigma\right)dy +$$

$$\frac{1}{\sigma_z}\int_0^\infty \left(\phi\left(\frac{z+m_z}{\sigma_z}\right)+\phi\left(\frac{z-m_z}{\sigma_z}\right)\right)P\left(\tau<\frac{R_z}{z}\right)$$

$$\left(\int_{-\frac{R_y}{R_z}z-m_y}^{\frac{R_y}{R_z}z-m_y}\frac{e^{-\frac{s^2}{2}}}{\sqrt{2\pi}}d\varsigma\right)dz.$$

Figure 9:
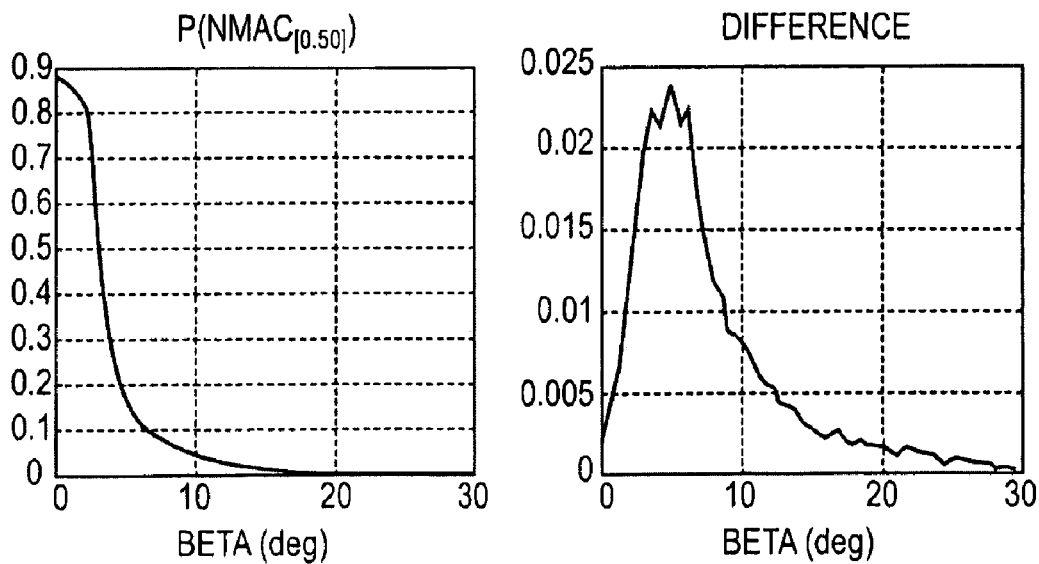
FIG. 9 is a diagram showing the probability of colliding with a detected object as a function of $$\beta = \arctan\frac{m_y}{m_x}$$

See FIG. 9 for an example on the application of (67).
FIG. 8: P(NMAC$_{(0,50)}$) as a function of $$\beta = \arctan\frac{m_y}{m_v}.$$

Approximate solution according to (55) using line through x=R and x=0 are shown by a solid and dashed line respectively, and the Monte Carlo solution of (46) ($\approx$0.034 at $\beta$=30) using 360000 samples is given by a dotted line. Here $s_x$=2400, $v_x$=120, $\sigma_s$=1200, $\sigma_v$=60, $\rho$=0.8, $m_y$=$m_v$ tan $\beta$ and $\sigma_y$=$(m_y/m_s\sigma_s+m_s10^{-3})^{1/2}$.

FIG. 9: P(NMAC$_{(0,\infty)}$) as a function of $$\beta = \arctan\frac{m_y}{m_v}.$$

Approximate solution according to (67) using M=100 and a rectangle with $R_y$=2×150 and $R_z$=2×75 through x=75 is shown by a solid line, and the Monte Carlo solution of (62) ($\approx$0/01 at $\beta$=19) using 360000 samples is given by a dotted line. Here $s_x$=2400, $v_x$=120, $\sigma_s$=800, $\sigma_v$=40, $\rho$=0.8, $m_y$=$m_v$ tan $\beta$, $m_z$=0, and $\sigma_y$=$((m_y/m_s\sigma_s)^2+m_s10^{-3})^2)^{1/2}$ and $\sigma_y$=$m_s10^{-3}$.

If y and z are correlated is should be possible to apply a rotation which decorrelate y and z. Any correlation between z and x is handled the same way as correlation between y and x according to the above.

Conclusions

This report provides a method for computing the cumulative probability of near midair collision between two objects.

Proof of Lemma 2

We know that by fixing the velocity $v(0)<0$, for a down-crossing of level R to occur within T sec the initial distance must be $$R < s(0) < R - v(0)T.$$

The probability for a down-crossing within T sec is $$P(N_{(0,T)}^- = 1) = \int_{-\infty}^{0} \left( \int_{R}^{R-vT} p_{s(0),v(0)}(s,v)\,ds \right) dv. \tag{69}$$

As a first step rewrite the distribution in (69) using the change of variables $$\begin{bmatrix} x \\ y \end{bmatrix} = \begin{bmatrix} \sigma_s\sqrt{1-\rho^2} & 0 \\ 0 & \sigma_v \end{bmatrix}^{-1} \begin{bmatrix} 1 & \rho\frac{\sigma_s}{\sigma_v} \\ 0 & 1 \end{bmatrix}^{-1} \begin{bmatrix} s - m_s \\ v - m_v \end{bmatrix}, \tag{70}$$

which yields $$P(N_{(0,T)}^- = 1) = \frac{1}{2\pi} \int_{\frac{m_v}{\sigma_v}}^{\infty} \int_{\frac{m_s - R + m_v T - (v\sigma_s + \sigma_v T)y}{\sigma_s\sqrt{1-\rho^2}}}^{\infty} e^{-\frac{x^2+y^2}{2}} dx\,dy - \tag{71}$$

$$\frac{1}{2\pi} \int_{\frac{m_v}{\sigma_v}}^{\infty} \int_{\frac{m_s - R - \rho\sigma_s y}{\sigma_s\sqrt{1-\rho^2}}}^{\infty} e^{-\frac{x^2+y^2}{2}} dx\,dy.$$

Now let $$\begin{bmatrix} u \\ v \end{bmatrix} = \begin{bmatrix} \sqrt{1-\gamma^2} & \gamma \\ 0 & 1 \end{bmatrix} \begin{bmatrix} x \\ y \end{bmatrix}, \gamma = \frac{\sigma_v T + \rho\sigma_s}{\sqrt{\sigma_v^2 T^2 + 2\rho_s\sigma_v T + \sigma_s^2}}, \tag{72}$$

for the first integral in (71) and $$\begin{bmatrix} u \\ v \end{bmatrix} = \begin{bmatrix} \sqrt{1-\rho^2} & \rho \\ 0 & 1 \end{bmatrix} \begin{bmatrix} x \\ y \end{bmatrix}, \tag{73}$$

for the second integral and we obtain the standard form $$P(N_{(0,T)}^- = 1) = \frac{1}{2\pi(1-\gamma^2)^{\frac{1}{2}}} \int_{\frac{m_v}{\sigma_v}}^{\infty} \int_{h}^{\infty} e^{-\frac{u^2 - 2\gamma uv + v^2}{2(1-\gamma^2)}} du\,dv - \tag{74}$$

$$\frac{1}{2\pi(1-\rho^2)^{\frac{1}{2}}} \int_{\frac{m_v}{\sigma_v}}^{\infty} \int_{\frac{m_s - R}{\sigma_s}}^{\infty} e^{-\frac{u^2 - 2\rho uv + v^2}{2(1-\rho^2)}} du\,dv$$

where $$h = \frac{m_s - R + m_v T}{\sqrt{\sigma_v^2 T^2 + 2\sigma_s\sigma_v\rho T + \sigma_s^2}}. \tag{75}$$

If we start by fixing $s(0)>R$ instead we have $$-\infty < v(0) < -\frac{s(0) - R}{T}. \tag{76}$$

The change of variables according to $$\begin{bmatrix} x \\ y \end{bmatrix} = \begin{bmatrix} \sigma_s & 0 \\ 0 & \sigma_v\sqrt{1-\rho^2} \end{bmatrix}^{-1} \begin{bmatrix} 1 & 0 \\ \rho\frac{\sigma_v}{\sigma_s} & 1 \end{bmatrix}^{-1} \begin{bmatrix} s - m_s \\ v - m_v \end{bmatrix} \tag{77}$$

yields $$P(N_{(0,T)}^- = 1) = \int_{R}^{\infty} \left( \int_{-\infty}^{-\frac{s-R}{T}} p_{s(0),v(0)}(s,v)\,dv \right) ds \tag{78}$$

$$= \frac{1}{2\pi} \int_{-\frac{m_s - R}{\sigma_s}}^{\infty} \int_{\frac{m_s - R + m_v T + (\sigma_s + \rho\sigma_v T)x}{\sigma_v T\sqrt{1-\rho^2}}}^{\infty} e^{-\frac{x^2+y^2}{2}} dy\,dx.$$

Now let $$\begin{bmatrix} u \\ v \end{bmatrix} = \begin{bmatrix} 1 & 0 \\ \eta & \sqrt{1-\eta^2} \end{bmatrix} \begin{bmatrix} x \\ y \end{bmatrix}, \eta = -\frac{\rho\sigma_v T + \sigma_s}{\sqrt{\sigma_v^2 T^2 + 2\rho\sigma_s\sigma_v T + \sigma_s^2}}, \tag{79}$$

which yields $$P(N_{(0,T)}^- = 1) = \frac{1}{2\pi(1-\eta^2)^{\frac{1}{2}}} \int_{-\frac{m_s - R}{\sigma_s}}^{\infty} \int_{h}^{\infty} e^{-\frac{u^2 - 2\eta uv + v^2}{2(1-\eta^2)}} dv\,du, \tag{80}$$

with h taken from (75).

Proof of Lemma 3

Using the density for $v_y$ and $\tau$ we have $$P(\tau|v_y(0)| < R \cap \tau < T) = P\left(|v_y(0)| < \frac{T}{\tau} \cap \tau \leq T\right) \tag{81}$$

$$= \int_0^T \int_{-R}^{R/t} p_{v_y,\tau}(y,t)\,dy\,dt.$$

Under the assumption that $\tau$ and $v_y$ are independent $$P(\tau|v_y(0)| < R \cap \tau < T) = \int_0^T \int_{-R/y}^{R/t} p_{v_y,\tau}(y)p_\tau(t)\,dy\,dt. \tag{82}$$

Changing the order of computation in (82) yields $$P(\tau|v_y(0)| < R \cap \tau < T = \int_{R/T}^{\infty} \int_0^{R/y} p_{v_y}(y)p_\tau(t)\,dt\,dy + \tag{83}$$

$$\int_{-R/T}^{R/T} \int_0^T p_{v_y}(y)p_\tau(t)\,dt\,dy + \int_{-\infty}^{-R/T} \int_0^{-R/y} p_{v_y}(y)p_\tau(t)\,dt\,dy$$

$$p_{v_y}(y)p_\tau(t)\,dt\,dy = P\left(|v_y| < \frac{R}{T}\right)P(\tau < T) +$$

$$\int_{R/T}^{\infty} (p_{v_y}(y) + p_{v_y}(-y))P\left(\tau < \frac{R}{y}\right)dy.$$

The distribution $P(\tau < T)$ can either be found starting from (48) and derive the distribution for $\tau$ when seen as the ratio of two random variables. For the case with two normal variables the result is given. However, $P(\tau<T)$ is exactly the same as the probability for a down-crossing to occur within $(0,T)$, i.e.

$$P(\tau<T)=P(N_{(0,T)}^-(s_x,R)=1). \tag{84}$$

Proof of Lemma 4

From (64) we have $$P\left(\left(\tau<\frac{R_y}{|v_y|}\right)\cap\left(\tau<\frac{R_z}{|v_z|}\right)\right)=P\left(\tau<\min\left(\frac{R_y}{|v_y|},\frac{R_z}{|v_z|}\right)\right)= \tag{85}$$

$$\int_{-\infty}^{\infty}p_{v_z}(z)\int_{-\infty}^{\infty}p_{v_y}(y)\int_{0}^{\min\left(\frac{R_y}{|y|},\frac{R_z}{|z|}\right)}p_\tau(t)\,dt\,dy\,dz.$$

Assume $R_y=R$ and $R_z=vR$, i.e. $v=R_z/R_y$. For $z>0$ the result is $$\int_{0}^{\infty}p_{v_z}(z)\int_{-\infty}^{\infty}p_{v_y}(y)\int_{0}^{\min\left(\frac{R_y}{|y|},\frac{R_z}{|z|}\right)}p_\tau(t)dt\,dy\,dz= \tag{86}$$

$$\int_{0}^{\infty}p_{v_z}(z)\int_{-\infty}^{-\frac{z}{v}}p_{v_y}y)P\left(\tau<\frac{R}{|y|}\right)dy\,dz+$$

$$\int_{0}^{\infty}p_{v_y}(z)\int_{-\frac{z}{v}}^{\frac{z}{v}}p_{v_y}(y)P\left(\tau<\frac{vR}{|z|}\right)dy\,dz+$$

$$\int_{0}^{\infty}p_{v_z}(z)\int_{\frac{z}{v}}^{\infty}p_{v_y}(y)P\left(\tau<\frac{R}{|y|}\right)dy\,dz.$$

Changing the order of integration for y and z in the first and third integral in (86) yields $$\int_{0}^{\infty}p_{v_z}(z)\int_{-\infty}^{\infty}p_{v_y}(y)\int_{0}^{\min\left(\frac{R_y}{|y|},\frac{R_z}{|z|}\right)}p_\tau(t)dt\,dy\,dz= \tag{87}$$

$$\int_{-\infty}^{0}p_{v_y}(y)P\left(\tau<\frac{R}{|y|}\right)\int_{0}^{-vy}p_{v_z}(z)dz\,dy+$$

$$\int_{0}^{\infty}p_{v_z}(z)P\left(\tau<\frac{vR}{|z|}\right)\int_{-\frac{z}{v}}^{\frac{z}{v}}p_{v_y}(y)dy\,dz+$$

$$\int_{0}^{\infty}p_{v_y}(y)P\left(\tau<\frac{R}{|y|}\right)\int_{0}^{vy}p_{v_z}(z)dz\,dy=$$

$$\int_{0}^{\infty}((p_{v_y}(-y)+p_{v_y}(y))P\left(\tau<\frac{R}{y}\right)P(0<v_z<vy)\,dy+$$

$$\int_{0}^{\infty}p_{v_z}(z)P\left(\tau<\frac{vR}{z}\right)P\left(|v_y|<\frac{z}{v}\right)dz.$$

Applying the same technique for $z<0$ yields $$\int_{-\infty}^{0}p_{v_z}(z)\int_{-\infty}^{\infty}p_{v_y}(y)\int_{0}^{\min\left(\frac{R_y}{|y|},\frac{R_z}{|z|}\right)}p_\tau(t)dt\,dy\,dz= \tag{88}$$

$$\int_{0}^{\infty}(p_{v_y}(-y)+p_{v_y}(y))P\left(\tau<\frac{R}{y}\right)P(-vy<v<0)\,dy+$$

$$\int_{0}^{\infty}p_{v_z}(-z)P\left(\tau<\frac{vR}{z}\right)P\left(|v_y|<\frac{z}{v}\right)dz,$$

which together with (87) yields $$P(NMAC_{(0,\infty)})\approx P((\tau|v_y|<R_y)\cap(\tau|v_z|<R_z))= \tag{89}$$

$$\int_{0}^{\infty}((p_{v_y}(-y)+p_{v_y}(y))P\left(\tau<\frac{R}{y}\right)P(|v_z|<vy)dy+$$

$$\int_{0}^{\infty}(p_{v_z}(-z)+p_{v_z}(z))P\left(\tau<\frac{vR}{z}\right)P\left(|v_y|<\frac{z}{v}\right)dz.$$

In FIG. 10 a schematic overview of an embodiment of a method for calculating a probability that a detected object 200 is going to collide with a vehicle 100, such as a UAV or the like is shown in an x-y coordinate system based on an angle accurate sensor, such as a camera. The coordinate system is rotated so that the x-axis is aligned with a line of sight to the detected object 200. The detected object 200 is approximated in distance as a stochastic process defining an elongated area/volume SP and a line L defines an approximated safety zone of the vehicle with a length of 2R in the y-direction of the coordinate system. The probability of the object 200 to collide with the vehicle 100, that is, when the stochastic process SP is calculated to come in contact with the line L, wherein the line L is defined between the end points (R,R) or (R, −R), is calculated by a method in the unmanned vehicle.

Figure 11:
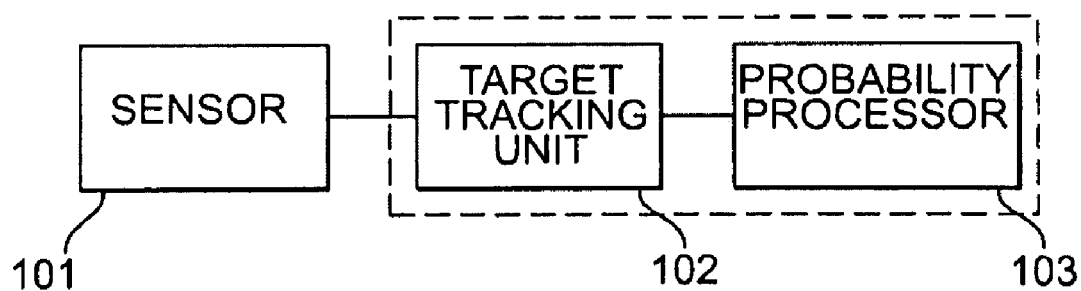

FIG. 11 discloses a schematic overview of units in an unmanned vehicle. The vehicle comprises an optical recording sensor 101, such as a digital camera or the like. The optical sensor 101 records an image of a detected object. Detection may be done by image processing and certain predetermined limits of values, such as colour differentiation between background and image part, predetermined shapes or the like. An angle to the detected object is rather accurate in the taken image but the distance to the object is more uncertain. The vehicle further comprises a target tracking unit 102, such as a processor performing a target tracking filter or the like, which is used to determine the direction of the detected object relative the vehicle. This data may be taken from a series of images taken by the optical sensor. From the image data and the direction/velocity from the target tracking unit 102 a probability processor 103 in the vehicle is arranged to calculate the probability of the detected object to collide with the vehicle. The unmanned vehicle may perform evasive actions based on the calculated probability, such as to turn away from the object or the like. An embodied UAV equipped with an installed inventive method may comprise a camera arranged to record images to detect an object and the direction and velocity of the object, a processor arranged to determine the direction and velocity as well as performing the calculation of probability of collision between the object and the UAV, and a control system in order to control the UAV. Hence, as shown in FIG. 11 as a dashed line, the processes of determining the relative direction and velocity of the object and the calculation of probability may be performed by the same processor.

Figure 12:
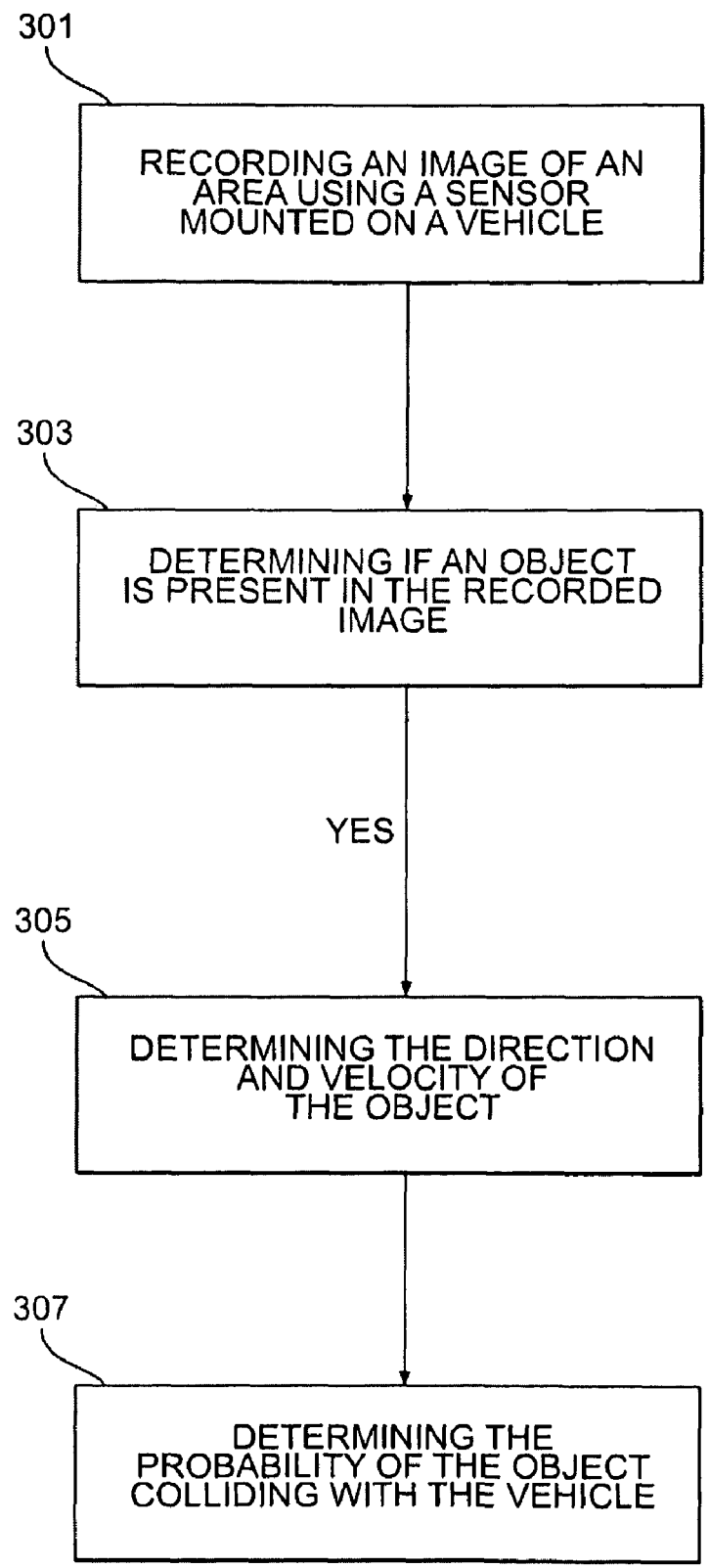
FIG. 12 shows a flowchart of a method for performing a calculation of a probability of collision.

FIG. 12 discloses a process for detecting an object and determining a probability of collision between a vehicle, such as a UAV, and the object.

In step 301, an image recording device, such as a camera or the like, records an image of an area. The vehicle may comprise a number of cameras directed in different directions in order to record as much of the surroundings of the vehicle. The vehicle may also/alternatively comprise merely one moveable camera to record the surrounding area.

In step 303, an image processing is preformed on the recorded image in order to determine the presence of an object. The detection of an object may be based on differentiation in colours, greyscales, forms or the like. It should be noted that during the process the recording device may continuously record images. The image processing is performed by a processor arranged in the vehicle.

If an object is present in the image the process continues to step 305. If no object is present in the image the process stops.

In step 305, a direction and velocity of the object relative the vehicle, also called relative velocity, is determined/read from a target tracking process, such as a kalman filter process or the like, wherein a direction and velocity of an object is calculated from a sequence of recorded data, such as images or the like. In the event of using same image as the one in step 303, the kalman filter would need at least two sequential images from the recording device in order to perform the kalman filtering process. The target tracking process is performed by a processor arranged in the vehicle. The target tracking unit may as well produce a relative position of the detected object to be used in the step of calculating the probability of collision.

In step 307, a probability of a collision between the vehicle and the object is calculated by a processor arranged in the vehicle. The process of calculating the probability is described in more detail above/below.

The process steps may be performed in separated processors or a single processor.

Figure 13:
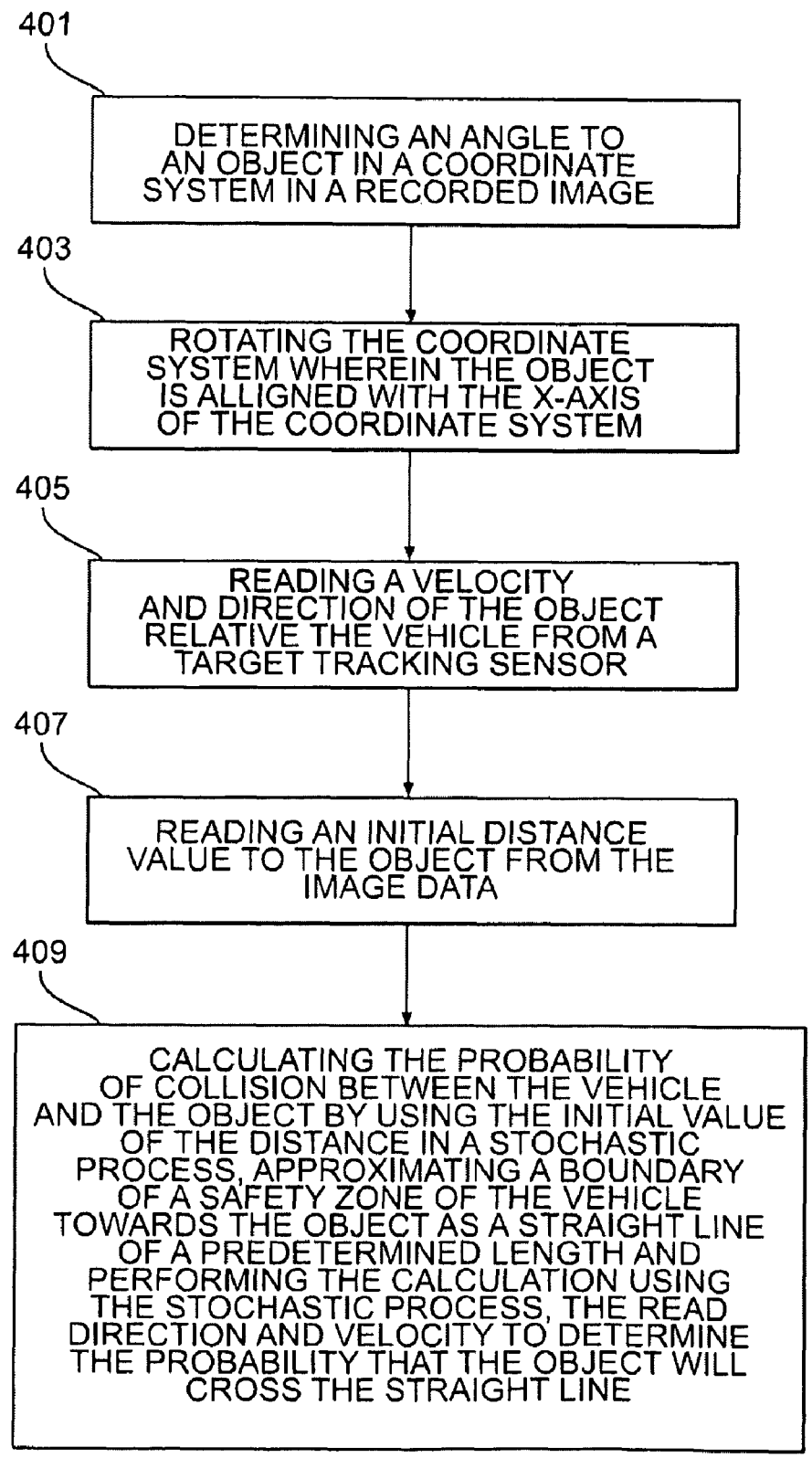
FIG. 13 shows a flowchart of a calculation of the probability of collision between a vehicle and an object.

In FIG. 13 a schematic flowchart of an embodiment of a method for calculating a probability of collision to occur between a vehicle and a detected object in an image recorded by a camera arranged at the vehicle is shown.

Figure 14:
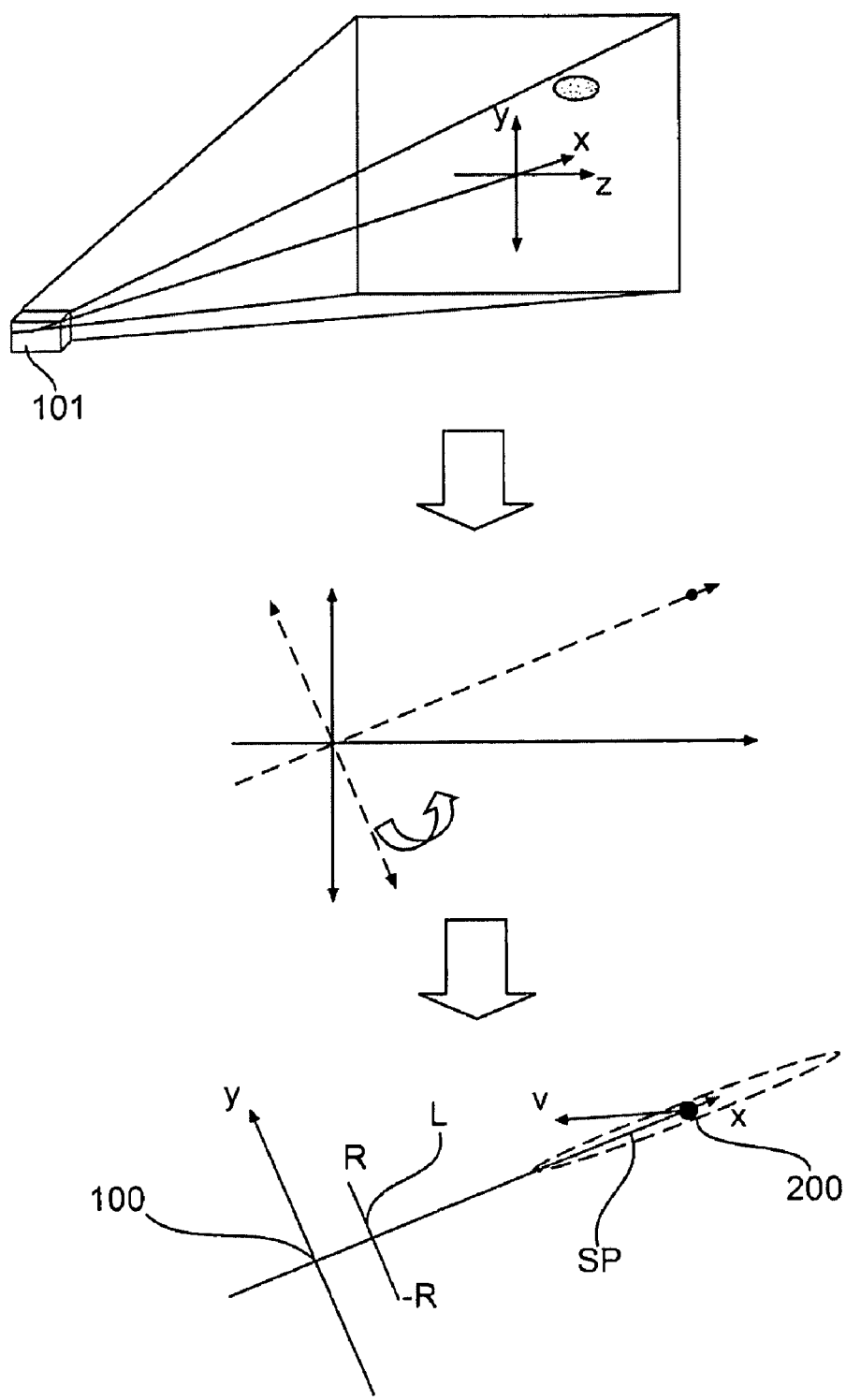
FIG. 14 shows a schematic overview of the process step in FIG. 13 for setting up the object in a coordinate system.

In step 401, the image is processed in an image processing step whereas an angle to the object in the image is determined considering the camera as an origin of coordinates in a coordinate system and the x-axis of the coordinate system is pointing into the image, described in FIG. 14.

In step 403, the coordinate system is rotated the determined angle around its point of origin to align a direction to the detected object with the x-axis of the coordinate system. It should here be noted that in the three dimensional case the coordinate system is rotated/turned so that the direction to the object in the image is aligned with the x-axis, with no readings on the y-axis or the z-axis of the coordinate system.

In step 405, data from a target tracking unit/process is read. In the target tracking process, such as a kalman filter process or the like, data from sequential images or data intake are processed in order to determine a relative position and velocity, that is, a position, a direction and a velocity of movement of the detected object relative the vehicle in the image. The direction and the velocity of movement are then read by the probability process. This step may be performed before step 403.

In step 407, an initial distance value is determined from the image, for example, the relative position from the tracking unit.

In step 408, a probability of colliding with the object is calculated. In the calculation the initial distance value is used in a stochastic process representing the uncertainty of the distance to the object. The probability calculation is performed by determining the probability of the stochastic process crossing a line of a predetermined length representing a boundary of a safety zone surrounding the vehicle taken the velocity and the direction relative the vehicle into account. It should be understood that in the case of three dimensional calculations the safety zone boundary may be represented by a rectangular/elliptic plane with a predetermined length and depth (y-length and z-length). The dimensions of the safety zone may be set to cover all possible sizes of the object with a large margin as the size of the object is not known or may be based on the dimensions of the vehicle. The elliptic plane facilitates the calculations as the calculations may not be as angle sensitive.

FIG. 14 shows a schematic overview of the process step in FIG. 13 for setting up the object in a coordinate system.

In the top figure a camera 101 or the like records an image 501 of an area containing an object 200. As illustrated is the figure a coordinate system is arranged in the image 501.

However, due to the fact that the angle to the detected object 200 is rather accurate the coordinate system is rotated a number of degrees according to the angle aligning the object 200 with the x-axis of the coordinate system as illustrated in the middle figure of FIG. 14 wherein the rotated coordinate system is the dashed line coordinate system. This in its turn facilitates the calculation of the probability of collision.

When performing the calculation of the probability of collision the uncertainty of the object 200 in y direction is very small and is rather large in the x-direction (as well as z-direction in the three dimensional case) in the rotated coordinate system. The result is disclosed in the lower figure of FIG. 14 displaying the FIG. 10 rotated, wherein the boundary to the safety zone is denoted as L, with a length of 2R, the distance uncertainty is defined as the stochastic process SP, and the relative velocity/direction of the object is denoted as v. This results in that the calculation is facilitated. The direction and velocity may be set up before or after the rotation of the coordinate system.

By using the method for calculating the probability of colliding as stated above, a method is provided that is not as computer intensive as known methods and therefore enables small, cost efficient UAVs to be constructed. The method also provides a possibility of setting up a probability per design and not, as known systems, performing an iterative process, performing flight tests, making manual adjustments and so on. The inventive process is much less computer intensive as it inter alia omits the discretion process of the Monte Carlo process.

It should be noted, that even if the described examples are directed toward a vehicle comprising an image recorder and a target tracking unit, the direction and the positioning data may be transferred to the vehicle over air or the like. That is, the vehicle may receive all data from a central station, for example, a radar station.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. A method for determining a probability of a vehicle colliding with an object, the method comprising:
   detecting the object,
   determining a stochastic process representing a relative distance between the vehicle and the detected object, the stochastic process having a direction and a velocity relative the vehicle,
   defining a safety zone of the vehicle in relation to the detected object as a straight line perpendicular to a line of sight of the detected object, and
   determining the probability of colliding with the detected object over a period of time as the probability of the stochastic process crossing the straight line with the direction and velocity of the stochastic process.

2. The method according to claim 1, wherein detecting the object comprises capturing an image with an optical sensor mounted on the vehicle and registering the object in the image, the method further comprising:
- determining a relative position and velocity of the detected object, and thereby a position, a direction and a velocity relative the vehicle, by a target tracking unit arranged in the vehicle, and
- determining the probability of colliding with the detected object over a period of time by considering the stochastic process and the probability of colliding with the detected object is set to be the probability of the stochastic process, with the position as an initial value, crossing the straight line taken the direction and velocity from the target tracking unit as the direction and velocity of the stochastic process.

3. The method according to claim 1, wherein the determining of the probability further comprises rotating a coordinate system such that an x-axis of the coordinate system is aligned with a x-axis of coordinate system and wherein the straight line of the safety zone has two end points and defining a predetermined length of the line and wherein the straight line is perpendicular to the x-axis of the coordinate system.

4. The method according to claim 1, wherein the safety zone is defined by a rectangular or an elliptic plane toward the detected object and the stochastic process is defined as a three dimensional entity and that the coordinate system further comprises a z-axis.

5. The method according to claim 4, the collision, near mid-air collision (NMAC), between the vehicle and the object is expressed as $$NMAC_{(0,T)} \Leftrightarrow \min_{0<t<T} \|s(t)\| < R \cap \|s(0)\| > R,$$

where
- s=distance between vehicle and object,
- R=half the predetermined length of the safety zone
- $\|s(t)\| = \sqrt{s_x^2(t) + s_z^2(t)}$ and the probability of a collision, P(NMAC), is formulated as $$P(NMAC_{(0,T)}) \approx P(\tau | v_y| < R \cap \tau < T),$$

where
- τ=represents the time it takes for the distance in the x-direction to become at least R
- v=velocity.

6. The method according to claim 4, the collision, near mid-air collision (NMAC), between the vehicle and the object is expressed as $$NMAC_{(0,T_1)} \Leftrightarrow \min_{0<t<T} \|s(t)\| < R \cap \|s(0)\| > R,$$

where
- s=distance between vehicle and object,
- R=the radius of the safety zone
- $\|s(t)\| = \sqrt{s_x^2(t) + s_z^2(t)}$ and the probability of a collision, P(NMAC), is formulated as $$P(NMAC_{(0,T)}) \approx P(\tau | v_y| < R \cap \tau < T),$$

where
- τ=represents the time it takes for the distance in the x-direction to become at least R
- v=velocity.

7. The method according to claim 1, wherein the collision, near mid-air collision (NMAC), between the vehicle and the object is expressed as $$NMAC_{(0,T)} \Leftrightarrow \min_{0<t<T} \|s(t)\| < R \cap \|s(0)\| > R,$$

where
- s=distance between vehicle and object,
- R=half the predetermined length of the safety zone
- $\|s(t)\| = \sqrt{s_x^2(t) + s_y^2(t)},$ and the probability of a collision, P(NMAC), is formulated as $$P(NMAC_{(0,T)}) \approx P(\tau | v_y| < R \cap \tau < T),$$

where
- τ=represents the time it takes for the distance in the x-direction to become at least R
- v=velocity.

8. A computer program product, comprising:
a computer readable medium; and
computer program instructions recorded on the computer readable medium and executable by a processor for carrying out a method for determining a probability of a vehicle colliding with an object, the method comprising detecting the object, determining a stochastic process representing a relative distance between the vehicle and the detected object, the stochastic process having a direction and a velocity relative the vehicle, defining a safety zone of the vehicle in relation to the detected object as a straight line perpendicular to a line of sight of the detected object, and determining the probability of colliding with the detected object over a period of time as the probability of the stochastic process crossing the straight line with the direction and velocity of the stochastic process.

9. A processor, comprising:
a computer program product installed thereon, the computer program product comprising a computer readable medium, and computer program instructions recorded on the computer readable medium and executable by a processor for carrying out a method for determining a probability of a vehicle colliding with an object, the method comprising detecting the object, determining a stochastic process representing a relative distance between the vehicle and the detected object, the stochastic process having a direction and a velocity relative the vehicle, defining a safety zone of the vehicle in relation to the detected object as a straight line perpendicular to a line of sight of the detected object, and determining the probability of colliding with the detected object over a period of time as the probability of the stochastic process crossing the straight line with the direction and velocity of the stochastic process.

10. An unmanned vehicle comprising:
an optical sensor,
a target tracking unit, and
a processor comprising a computer program product installed thereon, the computer program product comprising a computer readable medium, and computer program instructions recorded on the computer readable medium and executable by a processor for carrying out a method for determining a probability of a vehicle colliding with an object, the method comprising detecting the object, determining a stochastic process representing a relative distance between the vehicle and the detected object, the stochastic process having a direction and a velocity relative the vehicle, defining a safety zone of the vehicle in relation to the detected object as a straight line perpendicular to a line of sight of the detected object, and determining the probability of colliding with the detected object over a period of time as the probability of the stochastic process crossing the straight line with the direction and velocity of the stochastic process.

* * * * *